US012795194B2

(12) United States Patent
Dasher et al.

(10) Patent No.: US 12,795,194 B2
(45) Date of Patent: Nov. 10, 2026

(54) SYSTEMS AND METHODS FOR MITIGATING MOTION OCULAR DISCOMFORT IN LIVE STREAMING MEDIA

(71) Applicant: Adeia Guides Inc., San Jose, CA (US)

(72) Inventors: Charles Dasher, Lawrenceville, GA (US); Christopher Phillips, Hartwell, GA (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 50 days.

(21) Appl. No.: 18/943,382

(22) Filed: Nov. 11, 2024

(65) Prior Publication Data

US 2026/0136063 A1 May 14, 2026

(51) Int. Cl.
*H04N 21/431* (2011.01)
*H04N 21/2187* (2011.01)
*H04N 23/68* (2023.01)

(52) U.S. Cl.
CPC ..... *H04N 21/4318* (2013.01); *H04N 21/2187* (2013.01); *H04N 23/683* (2023.01)

(58) Field of Classification Search
None
See application file for complete search history.

(56) References Cited

U.S. PATENT DOCUMENTS 5,684,918 A * 11/1997 Abecassis ............ H04N 21/435 348/E7.071
2002/0116629 A1* 8/2002 Bantz .................... G06Q 30/02 726/26
2003/0073922 A1* 4/2003 Miller ...................... H04N 1/00 600/545
2011/0081132 A1* 4/2011 Iwata ..................... H04N 9/877 386/353
2012/0075530 A1* 3/2012 Miyazaki ............... H04N 7/183 348/E7.091
(Continued)

FOREIGN PATENT DOCUMENTS

WO WO-2022220307 A1 * 10/2022 ............. G06Q 10/40

OTHER PUBLICATIONS

Becker, Jackie, et al., "Mitigating Visually-Induced Motion Sickness in Virtual Reality," Stanford University (2016).
(Continued)

*Primary Examiner* — William J Kim
(74) *Attorney, Agent, or Firm* — HG LAW LLP

(57) ABSTRACT

The present application provides for mitigating motion ocular discomfort in live streaming media. In some embodiments, a media server performs a calibration for motion sensitivity for a user. For example, the media server may access calibration data based on receiving user feedback as to the level of comfort or discomfort (e.g., the user may select an emoji that corresponds with their level of comfort). The media server may then select a sensitivity setting for the user based on the feedback indicating the user experienced undesirable visuals in the video stream. The media server may, based on determining that visual characteristics of a first portion of the video stream correspond to a sensitivity setting for the user, cause a visual modification to be applied to the video stream to adjust the visual characteristics to mitigate the ocular discomfort.

18 Claims, 27 Drawing Sheets

(56) References Cited

U.S. PATENT DOCUMENTS

| | | | | |
|---|---|---|---|---|
| 2012/0320224 | A1* | 12/2012 | Miyoshi | H04N 23/81 348/207.1 |
| 2018/0338132 | A1* | 11/2018 | Rao Padebettu | H04N 13/344 |
| 2019/0222765 | A1* | 7/2019 | Hundemer | H04N 21/234 |
| 2019/0269881 | A1* | 9/2019 | Iida | A61M 21/02 |
| 2022/0132030 | A1 | 4/2022 | Edpalm et al. | |
| 2024/0338801 | A1* | 10/2024 | Nara | G06T 5/70 |

OTHER PUBLICATIONS

Brodsky, Sascha, "How New Tech Could Prevent VR Motion Sickness," Livewire, https://www.lifewire.com/how-new-tech-could-prevent-vr-motion-sickness-5181084 (2021).

Liu, Ran, et al., "Measuring visually induced motion sickness using wearable devices," Society for Imaging Science and Technology (2017).

Liu, Hailong, et al., Subjective Vertical Conflict Model with Visual Vertical: Predicting Motion Sickness on Autonomous Personal Mobility Vehicles, IEEE Transactions on Intelligent Transportation Systems, vol. 25, Iss. 8 (2024).

* cited by examiner

1600

1700

SYSTEMS AND METHODS FOR MITIGATING MOTION OCULAR DISCOMFORT IN LIVE STREAMING MEDIA

BACKGROUND

This disclosure is related to systems and methods for altering transmission and playing of media content, namely altering video content to mitigate ocular discomfort.

SUMMARY

Live streaming systems via mobile devices have become increasingly prevalent, with software systems such as FaceTime, other video calling platforms, and live streaming services enabling users to communicate and share experiences in real time through video. Despite the convenience and ubiquity of such systems, such systems often provide video and media that cause participants to suffer from motion sickness (e.g., induced by excessive motion in the video feeds). Videos that induce such motion sickness can be generated by the system, for example, when a mobile device from which a video originates (e.g., by camera capture from a video streamer) moves quickly with a lot of acceleration along different vectors or erratically, resulting in a video feed that appears shaky or disorienting. This issue is particularly problematic for systems that have users who are sensitive to visual motion and can significantly detract from the live streaming experience.

In one approach, systems enhance hardware and software capabilities by, for example, improving camera stabilization and screen refresh rates to mitigate distorted video. Standard image stabilization features in mobile devices aim to reduce shakiness, but these do not address the specific needs of users of the system who are sensitive to motion. Moreover, this approach does not allow the system to cater to the subjective nature of motion sickness sensitivity, which varies widely among individuals. Another deficiency of this approach is that there is no mechanism for the system to allow participants or viewers to communicate their sensitivity to motion sickness to the streamer, nor is there a system in place to automatically adjust the video feed based on individual preferences.

As a result, the system allows participants and viewers who experience motion sickness to rely only on manual adjustments (e.g., by the streamer), which can only be accomplished by the user informing the streamer (e.g., be voice, comments, or text messages) which is neither efficient nor reliable. The absence of personalized solutions that can dynamically adapt to the user's specific needs and thresholds highlights a significant gap in current live streaming systems. Consequently, there is a need for an approach that allows for real-time adjustments based on user-specific sensitivity to motion, thereby providing a more comfortable and inclusive live streaming system for all participants and viewers.

To solve these problems, systems and methods are provided herein for providing content adjustments that mitigate video that is likely to cause motion ocular discomfort (e.g., in live streaming media, conference calls, or other types of video content). In some embodiments, a media server accesses calibration data for motion sensitivity for a user. In one example, the calibration data is based on the media server displaying a calibration video that displays many motion types and requests user interface feedback as to the level of comfort or discomfort (e.g., the user interface may be used to receive a selection of an emoji that corresponds with the user's level of comfort). In another example, the calibration data may be based on the media server performing a real-time calibration where the media server may receive feedback as to the level of comfort or discomfort by monitoring actions taken during normal media viewing over time (e.g., user watching streaming services, etc.). The media server may then select a sensitivity setting for the user profile of the device based on the user interface feedback indicating the undesirable visuals in the video stream. For example, the system may receive a dizzy-faced emoji as a user-interface input via the user interface during a vertical shaking motion type in the calibration video and stores this input for the respective user profile in a connected data structure. There may be multiple sensitivity options for selection via user-interface that include selections in a range of desirable to undesirable.

In some embodiments, during transmission of a video stream (e.g., a live stream from a streamer), the media server may determine that the visual characteristics from the video stream corresponds to the sensitivity setting for user that is undesirable. A sensitivity setting may be one or more maximum thresholds of comfort for a user, a certain frequency of motion types that cause motion sickness, a patterned motion type causing undesirable ocular discomfort (e.g., detected brightness patterns), data from sensor streams, or a combination of some or all the above. For example, the live streamer may shake the camera in a choppy vertical motion which, based on the previous calibration, indicates the user will likely experience dizziness. Based on this correspondence, the media server causes a visual modification to be applied to the video stream for the remainder of the video stream. For example, the media server may apply a blurring effect in order to smooth out the choppy vertical motions and make the video stream less erratic. In other approaches, the media server may drop frames to reduce visual jitter of the motions or replace the stream with a single frame (e.g., a placeholder image).

In some embodiments, the video stream originates as a live stream of a camera feed of a second device and the user receives the live stream on a first device. For example, an influencer is live streaming to their subscribers that include the first user. Based on determining that the visual characteristics of a portion of the video stream that corresponds to at least one sensitivity setting for the user, the media server may transmit a notification to the second device (e.g., the streamer) that the visuals are undesirable for the user on the first device. The portion of the video stream may be an adaptive bitrate streaming segment or chunk. In some embodiments, the media server may also determine a percentage of users whose respective sensitivity settings correspond to the portion of the video stream. In some embodiments, the media server may receive inertial measurement unit (IMU) sensor data from the second device (e.g., the streamer's smartphone) that may be analyzed to determine whether the visual characteristics of the first portion of the video stream corresponds to the at least one sensitivity setting for the user. The IMU sensor data may be multiplexed to the first portion of the video stream such that the IMU sensor data related to one or more frames of the first portion of the video are received prior to the respective one or more frames of the first portion of the video. This ensures that the IMU sensor data may be analyzed and processed prior to the client-device video frames being displayed. For example, the decision to modify the video frame is made before, or at the same time, the video frame is being decoded. Once decoded, the first device (e.g., the device receiving the stream) may apply the visual modification to the decoded frame before display.

In some embodiments, the media server may determine that that visual characteristics of the first portion of the video stream corresponds to a second sensitivity setting. The second sensitivity setting is a higher threshold indicative of a higher level of undesirability by feedback data from the user of the user device. For example, in some instances, even though the user corresponds to the sensitivity setting that indicates discomfort, it may still be tolerable with a minor visual alteration such as blurring. However, this second sensitivity setting is a more severe threshold where the user cannot endure the video stream. In such a case, the media server may cause a significant visual modification to be applied to the stream. For example, the media server may replace the first portion of the video stream with a static frame of the first portion of the video stream (e.g., a placeholder image).

In some embodiments, the media server may provide a calibration for a first device and second device that are both associated with a first user (e.g., a user's smartphone and a user's smart television). The user may be able to view the media on their smartphone without motion sickness, but once the media is cast to the smart television having a larger screen, they may suffer from motion sickness. The media server may perform a calibration for motion sensitivity for the user's second device subsequent to the user's first device. The media server may then select at least one sensitivity setting for the user based on the user's second device feedback data that indicates visual characteristics that are indicated as undesirable by the feedback data (e.g., the user experiences motion sickness). The media server may store the sensitivity setting for the user based on the user's second device feedback data in the user's profile that has separate feedback data for the plurality of devices (e.g., the smartphone and the smart television).

In some embodiments, the media server may perform the steps to apply visual modifications that mitigate video that is likely to cause motion ocular discomfort. In other embodiments, the first device (e.g., the smartphone of a user that receives the video stream) may be configured to apply visual modifications that mitigate video that is likely to cause motion ocular discomfort. In this embodiment, the first device may perform any and all of the steps previously described as being performed by the media server. In yet other embodiments, the second device (e.g., the smartphone of a user that streams the video stream) may be configured to apply visual modifications that mitigate video that is likely to cause motion ocular discomfort. In this embodiment, the second device may perform any and all of the steps previously described as being performed by the media server.

By providing calibration for the user (whether initially prior to transmission or in real-time during transmission), and determining whether various sensitivity settings are met, the system may apply a customized level of visual modification based on the subjective user experience of discomfort in relation to motion sickness. The present system is not reliant on enhanced hardware or reliant solely on manual adjustments at the video streamer device to accommodate one or more users participating in the video stream. Instead, each user may receive customized visual modifications to the same received video stream without manual real-time adjustments on the user device. Moreover, the present system provides visual modifications to mitigate motion sickness for a variety of video applications including video conferencing, one-way streaming (e.g., video-on-demand streaming), and other video applications.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
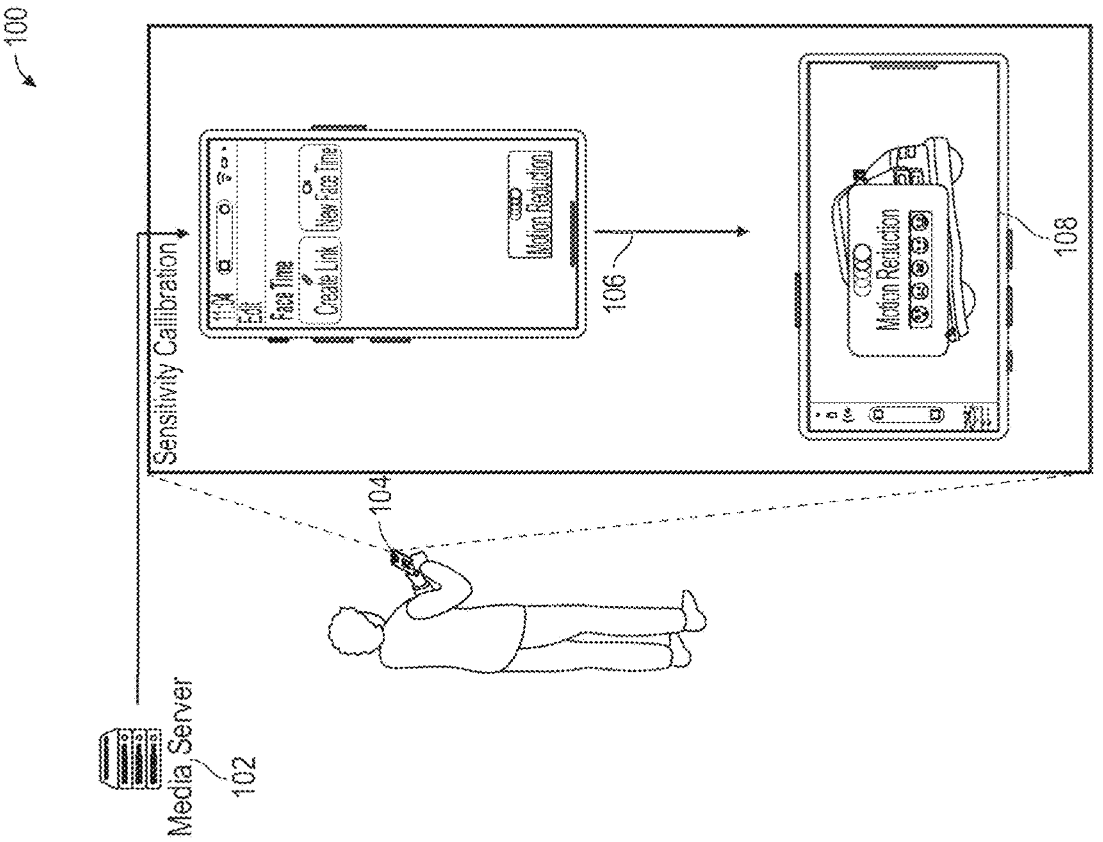
FIG. 1A shows an illustrative scenario in which the media server implements a sensitivity calibration for a user of a user device, in accordance with some embodiments of this disclosure.

FIG. 1A shows an illustrative scenario 100 in which the media server implements a sensitivity calibration for a user of a user device, in accordance with some embodiments of this disclosure. A media server may be any device that has processing capability and connectivity to a communications network that facilitates transmission of media and alteration of the transmitted media. In some embodiments, the media server may perform a calibration for motion sensitivity for a user of a user device by generating for display a calibration video. The calibration video may include depictions of a plurality of motion types. As shown in FIG. 1A, the media server 102 may generate for display on a user device 104 a calibration video via video call as shown at 106. The calibration video may be of a vehicle moving at a high rate of speed making quick turns. At 108, a depiction of a motion type is shown with a user interface generated asking for feedback from the user device.

Figure 1B:
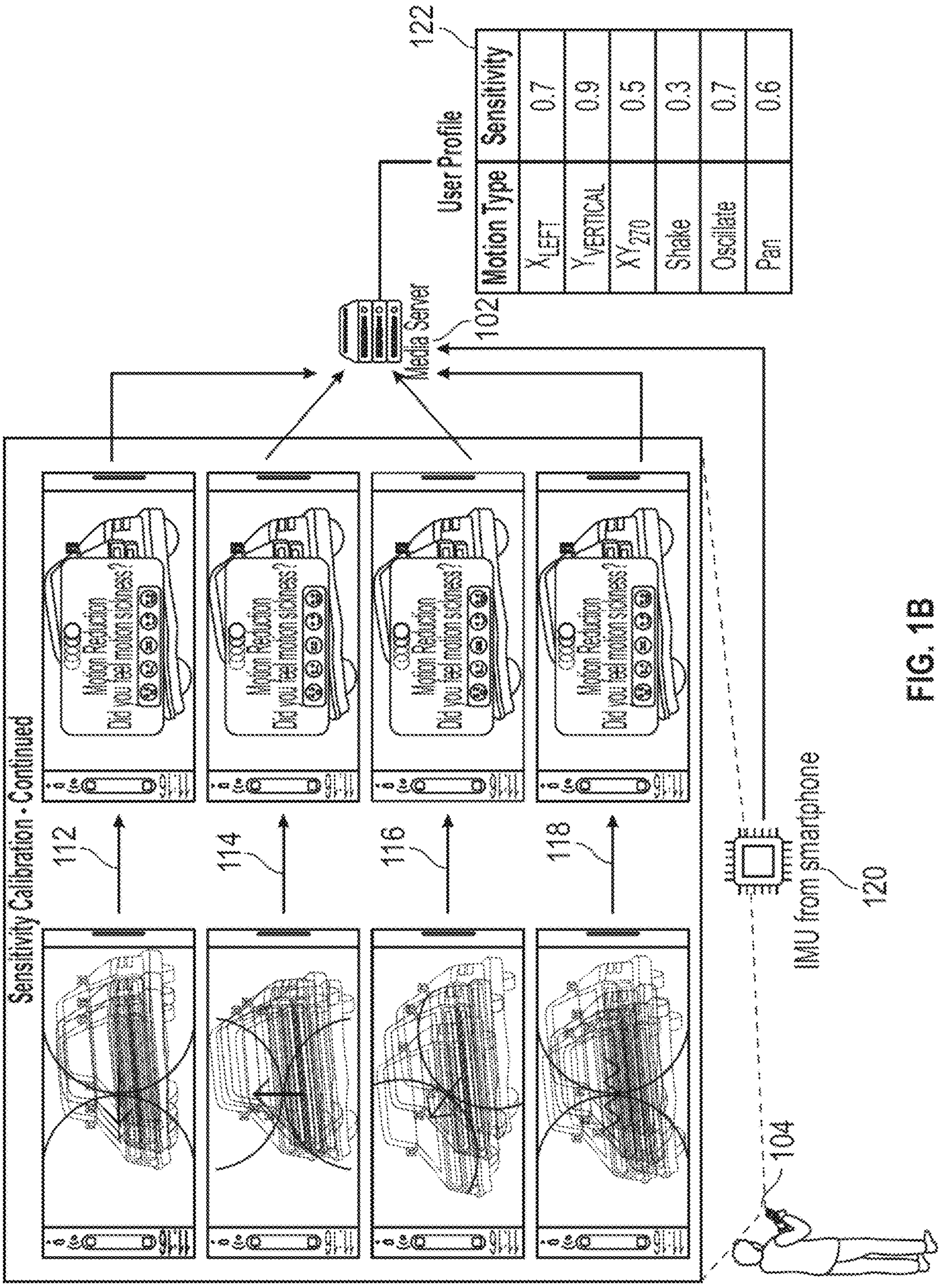
FIG. 1B shows an illustrative scenario in which the media server implements a sensitivity calibration to determine sensitivity for a plurality of motion types, in accordance with some embodiments of this disclosure.

FIG. 1B shows an illustrative scenario 110 in which the media server implements a sensitivity calibration to determine sensitivity for a plurality of motion types, in accordance with some embodiments of this disclosure. Similar to FIG. 1A, FIG. 1B shows various other motion types at 112, 114, 116, 118 that are generated for display via user interface that also generate for display a sensitivity scale of discomfort. For example, the motion type is a leftward motion at 112, the motion type is an upward motion at 114, the motion type is a diagonal motion at 116, and the motion type is a shaking motion at 118. In some embodiments, the media server may receive feedback data provided based on the calibration video. For example, the media server 102 may receive, from the user device 104, a neutral emoji selection for the leftward motion type of 112, whereas the media server may receive a dizzy emoji for the shaking motion type 118. In some embodiments, the media server may receive sensor data from an inertial measurement unit (IMU) sensor. The IMU data may contain motion-based data (e.g., data derived from accelerometers, gyroscopes, and/or magnetometers) that is provided to the media server. In some embodiments, the IMU may be integrated into the user device. In some embodiments, the IMU may be a separate hardware device that relays data to the media server. In some embodiments, the media server may create a data structure and store the received feedback in the data structure. For example, at 122, an exemplary data structure is shown storing the motion type and the corresponding sensitivity data.

In some embodiments, the media server may be able to perform on-the-fly calibration by receiving IMU data. When performing the calibration for motion sensitivity for the user of the user device, the media server may generate for display a plurality of videos requested by the user from a plurality of media services. For example, the media server may generate videos for display from various streaming services such as Netflix, Hulu, YouTube, Twitch, etc. The media server may, when receiving the feedback data, gather biometric data while generating for display the plurality of videos requested by the user from the plurality of media services. For example, the media server may receive biometrics from the user via the user device (e.g., IMU data, heartrate, perspiration, vibrations, etc.). The user device may be a wearable device such as a smartwatch, XR headset, smartphone, or other type of device that records biometric information from the user. The media server may determine, based on the biometric data, the associated response to the media. For example, the media server may be able to tell based on biometric data, when the user selects to switch away from the media suggesting undesirable response (e.g., dizziness or other ocular discomfort).

In some embodiments, the media server may provide a calibration for a first device and second device that are both associated with a first user (e.g., a user's smartphone and a user's smart television). For example, the user may be able to view the media on their smartphone (e.g., first device) without motion sickness, but once the media is cast to the smart television having a larger screen (e.g., second device), they may suffer from motion sickness. The media server may, perform a calibration for motion sensitivity for the user's second device subsequent to the user's first device. The media server may then select at least one sensitivity setting for the user based on the user's second device feedback data that indicates visual characteristics that are indicated as undesirable by the feedback data (e.g., the user experiences motion sickness). For example, similar to FIG. 1A at 108, the media server receives an emoji that corresponds to the user's level of comfort with the specific motion type. The media server may store the sensitivity setting for the user based on the user's second device feedback data in the user's profile that has separate feedback data for the plurality of devices (e.g., the smartphone and the smart television). The storing of the sensitivity setting may be the same storage of the feedback data for the first device that may be local storage to the media server, cloud storage, or local user device storage.

In some embodiments, the media server may perform a real-time calibration where the media server may receive feedback as to the level of comfort or discomfort by monitoring actions taken during normal media viewing over time (e.g., user watching streaming services, etc.). For example, if the user watches streaming services, the media server may determine, based on the type of detected movements in the media, the corresponding actions taken by the user, such as switching away from the media proximate to the time of the detected movement. In some embodiments, the media server may also monitor biometrics through input via a wearable device. In some embodiments, the media server may also receive IMU data to use solely or in addition to the aforementioned data (e.g., detected movements and/or biometrics). In some embodiments, the real-time calibration may be performed by the first device (e.g., the device receiving the video feed).

In some embodiments, the media server may select at least one sensitivity setting for the user based on the feedback data. A sensitivity setting may be one or more maximum thresholds of comfort for a user, a certain frequency of motion types that cause motion sickness, a patterned motion type causing undesirable ocular discomfort, or a combination of some or all of the above. The sensitivity setting may indicate visual characteristics that are indicated as undesirable by the feedback data. The media server may generate for display, through a user interface, a plurality of sensitivity options for selection comprising a range of selections from desirable to undesirable. Returning to the example, there are a number of emojis generated for display that start from very happy, to happy, to neutral, to sad, to dizzy. This is intended to be a progressive scale of comfort with neutral in the middle and two settings of comfort or very comfortable and conversely uncomfortable and very uncomfortable. The media may then receive a user interface input from the user device indicating a selected sensitivity option from the plurality of sensitivity options. For example, if the media server may receive a dizzy emoji for the shaking motion type 118, the server may select a sensitivity setting associated with the visual characteristic that caused dizziness. The sensitivity setting may be a mathematical expression, confidence value, mean, average, or other computable means that represent the sensitivity of the user based on the received feedback.

Figure 1C:
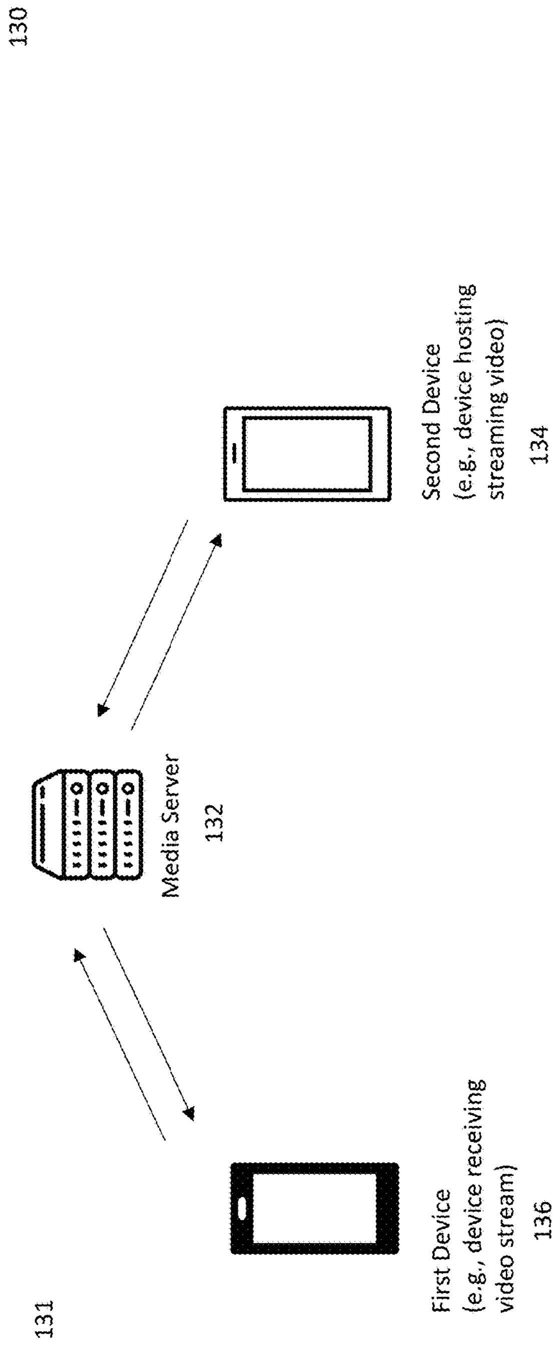
FIG. 1C shows an illustrative scenario in which the media server, a first device, and a second device perform visual modifications to the video stream to prevent ocular discomfort, in accordance with some embodiments of this disclosure.

FIG. 1C shows an illustrative scenario 130 in which any one of the media server, a first device, and a second device perform visual modifications to the video stream to prevent ocular discomfort, in accordance with some embodiments of this disclosure. In one example, second device 134 provides a video stream via the media server 132 (e.g., a stream hosting server). In this example, first device 136 receives the stream from the second device 134 via server 132. At 131, as previously outlined above, the media server 132 may determine visual characteristics of a first portion of the video stream (e.g., streamed by device 2 at 134) corresponds to the at least one sensitivity setting for the user of the first device at 126 and causes at least one visual modification to be applied to the video stream. In this embodiment, the media server performs the actions receiving video stream data from device 2 and sensitivity and calibration data from the first device to cause the visual modification to be applied to the video stream. In another embodiment, the second device 134 (hosting the streaming video) may determine visual characteristics of a first portion of the video stream (e.g., streamed by device 2 at 134) corresponds to the at least one sensitivity setting for the user of the first device at 126 and causes at least one visual modification to be applied to the video stream. In another embodiment, the first device 134 (receiving the streaming video) may determine visual characteristics of a first portion of the video stream (e.g., streamed by device 2 at 134) corresponds to the at least one sensitivity setting for the user of the first device at 126 and causes at least one visual modification to be applied to the video stream locally. In other embodiments, these steps may be performed in a way distributed between devices 132, 134, 136. For example, certain visual modification may be tracked an applied at second device 134, some by server 132, and some by device 136. For example, some issues that may affect large number of clients are handled by the server, while some issues that are specific to a few users may be handled by the first device 136.

Figure 1D:
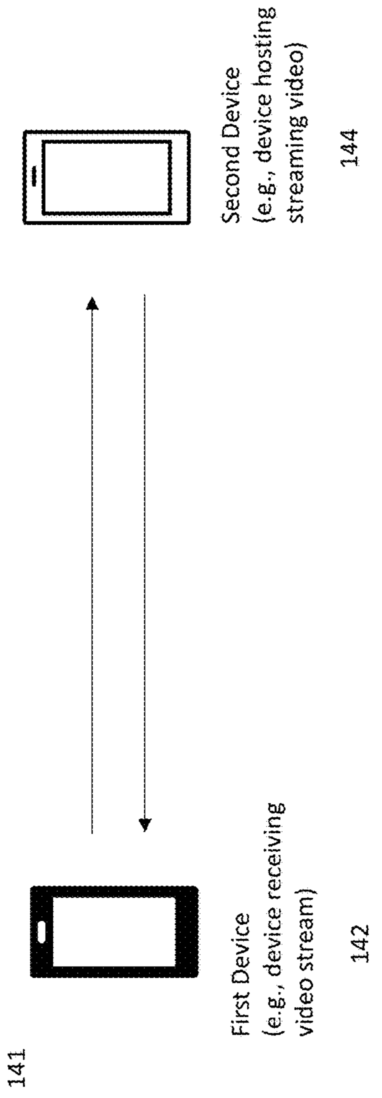
FIG. 1D shows an illustrative scenario in which a first device, and a second device perform visual modifications to the video stream to prevent ocular discomfort, in accordance with some embodiments of this disclosure.

FIG. 1D shows an illustrative scenario 141 in which a first device, and a second device perform visual modifications to the video stream to prevent ocular discomfort, in accordance with some embodiments of this disclosure. In this configuration, the first device 142 and the second device 144 are configured in a peer-to-peer configuration. In some embodiments, the second device 144 may determine visual characteristics of a first portion of the video stream corresponds to the at least one sensitivity setting for the user of the first device at 142 and cause at least one visual modification to be applied to the video stream. In this embodiment, the second device performs the actions receiving sensitivity and calibration data from the first device to cause the visual modification to be applied to the video stream to transmit to the first device. In other embodiments, the first device may determine visual characteristics of a first portion of the video stream (e.g., received from the second device at 144) corresponding to the at least one sensitivity setting for the user of the first device and cause at least one visual modification to be applied to the video stream. In this embodiment, the first device performs the actions receiving the video stream from the second device to request the second device to apply the visual modification to be applied to the video stream to be retransmitted to the first device. In other embodiments, these steps may be performed in a way distributed between devices 142 and 144.

Figure 2:
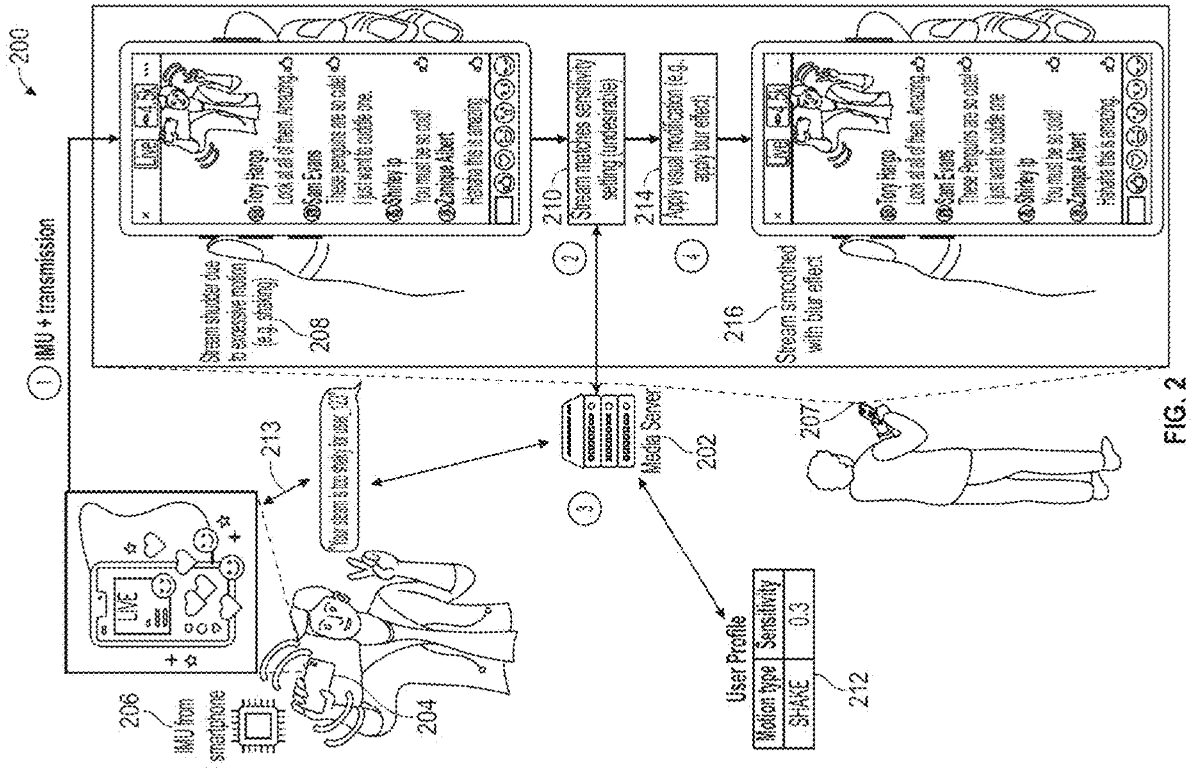
FIG. 2 shows an illustrative scenario in which a media server modifies a video stream to mitigate undesirable ocular discomfort for a user, in accordance with some embodiments of this disclosure.

FIG. 2 shows an illustrative scenario 200 in which a media server modifies a video stream to mitigate undesirable ocular discomfort for a user, in accordance with some embodiments of this disclosure. In some embodiments, the user device is a first user device and a video stream originates as a live stream of a camera feed of second device. For example, the media server 202 is facilitating a live stream video from user device 204 that has an embedded IMU 206. The media server receives the IMU and transmission and relays this to another user device 207 which is subscribed to the live stream. The media server 202 receives feedback from the user device that there is excessive visual jitter due to excessive motion 208 (e.g., the user that is live stream is shaking their hand excessively where their hand is also holding the camera that is providing the stream). The media server may, during transmission of a video stream to the user device, determine that visual characteristics of a first portion of the video stream correspond to the at least one sensitivity setting for the user. In a live streaming application, the first portion of the video stream may be adaptive bitrate segment (e.g., media from Facebook Live, X live, YouTube live, etc.). In a video conferencing application, the first portion of the video stream may include WebRTC, QUIC, or other Real-time Transport Protocol (RTP) type of protocol to facilitate video stream data streaming. In some embodiments, the determination that visual characteristics of a first portion of the video stream correspond to the at least one sensitivity setting for the user may be implemented using computer vision techniques that analyze image for motion and level of ocular clarity that may include the implementation of machine learning techniques (e.g., generative adverse networks trained on a variety of motion-based media). Returning to the example, if the media server 202 may determine that the visual jitter motion type corresponds to a sensitivity setting for the shaking motion type 210 by verifying the user profile 212. In some embodiments, the media server may, based at least in part on a determination that the visual characteristics of the first portion of the video stream correspond to the at least one sensitivity setting for the user, transmit for display on the second user device, a notification that visual characteristics are indicated as undesirable for at least one device that is receiving the live stream. For example, the media server 202 may generate for display via a user interface for the streamer's user device 204 that "Your stream is too shaky for user_A" corresponding to user device 207 in FIG. 2.

Figure 3:
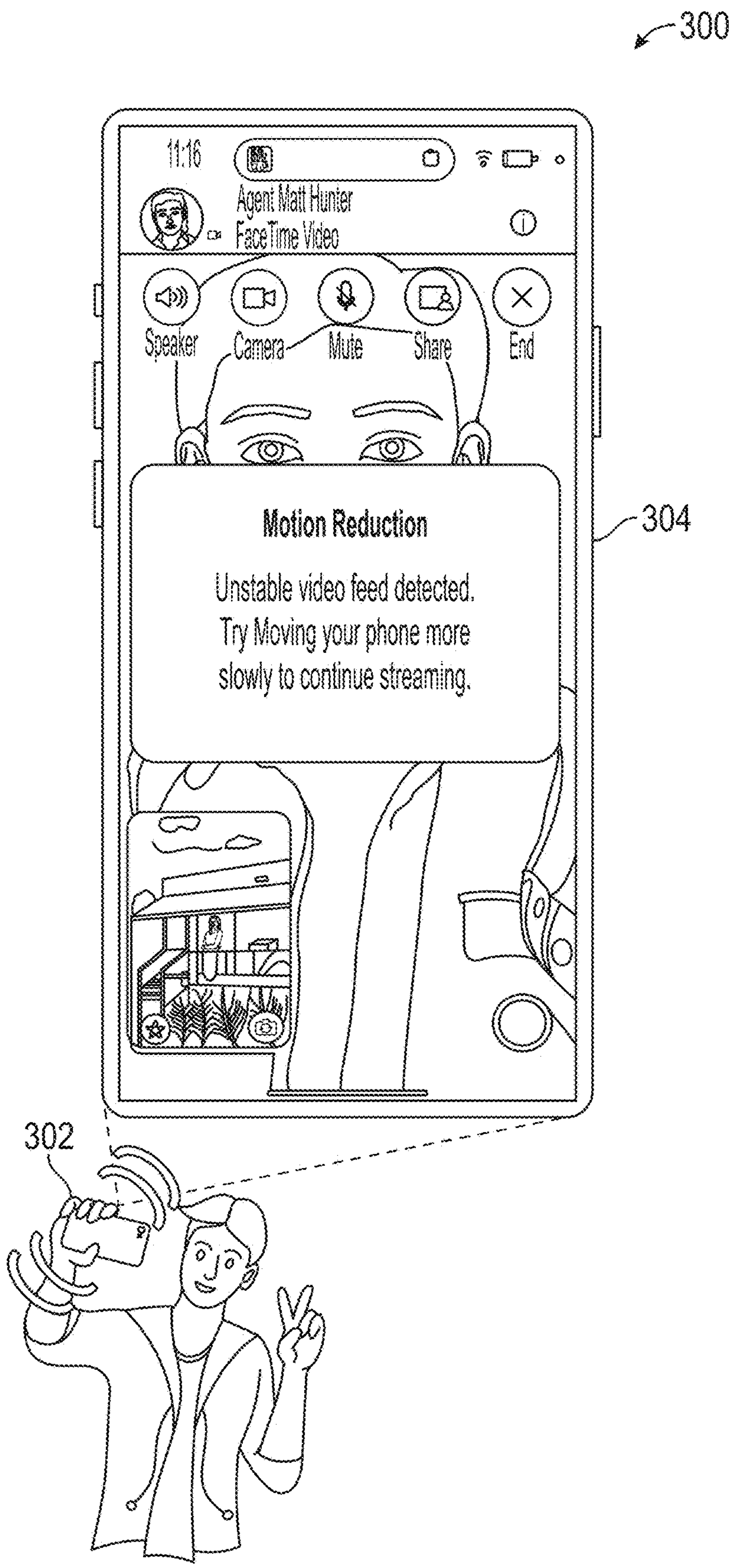
FIG. 3 shows an illustrative scenario in which a host of a video stream receives a notification from the media server that the video stream is unstable, in accordance with some embodiments of this disclosure.

FIG. 3 shows an illustrative scenario 300 in which a host of a video stream receives a notification from the media server that the video stream is unstable, in accordance with some embodiments of this disclosure. In this example, the streamer on user device 302 receives a notification 304 stating that "Motion Reduction: Unstable video feed detected. Try moving your phone more slowly to continue streaming." In some embodiments, there is a placeholder image that replaces the live stream while the notification is on screen. This may be particularly useful when the second user is hosting a video conferencing session where one user, of a plurality of users, may have their sensitivity setting correspond. If so, the second user receives the notification and the visual modification is applied to the video stream. In some embodiments, the media server only applies the visual modification to the user device corresponding to the user having their sensitivity setting correspond. In other embodiments, the media server may apply the visual modification to the second device which provides that the visual modification will be transmitted to the plurality of users (including the user device corresponding to the user having their sensitivity setting correspond).

Based on the determination that that visual characteristics of a first portion of the video stream corresponds to the at least one sensitivity setting for the user, the media server may cause at least one visual modification to be applied to the stream to adjust the visual characteristics for duration of the first portion of the video stream. A visual modification may include, but is not limited to, applying a blur filter to the first portion of the video stream, dropping a subset of frames of the first portion of the video stream, or replacing the first portion of the video stream with a static frame of the first portion of the video stream. For example, if the video stream is currently set to 30 frames per second (fps), the media server may request the user device that is transmitting the video stream to adjust the framerate to 24 fps. In some embodiments, the media server may provide the alteration and reencode the video stream from 30 fps to 24 fps. In a similar example, if the video stream is currently set to 30 frames per second (fps), the second device (e.g., the streaming device) may adjust the video stream framerate to 24 fps. In yet another similar example, the first device may directly request the second device (e.g., streamer device) to alter the video quality. In both cases the reduction of removing 6 frames per second may improve the smoothness of the video stream. In some embodiments, the media server may apply one or more blur effects to the video stream to provide a smoother output. For example, the blur effect may include one or more of the following effects: gaussian blur (e.g., applying a smooth, evenly distributed blur across the image to soften harsh edges and reduce the appearance of choppiness), motion blur (e.g., simulating the effect of movement, making fast-moving objects appear smoother), radial blur (e.g., radiating out from a central point that can be used to draw attention to a specific part of the video while smoothing out the rest), bokeh blur (e.g., mimicking the out-of-focus areas seen in photography, creating a pleasing, soft background that can help reduce visual distractions), and/or grainy blur (e.g., adds texture to the blur that can mask imperfections and reduce the perception of choppiness in lower-quality footage). In some embodiments, visual modification may include requesting a higher video quality version of the first portion of the video to the user device to cause the user device to adjust the visual characteristics of the higher video quality version of the first portion of the video (e.g., adjusting framerate, encoding bitrate, resolution, and other visual attributes of the quality of the video transmission). The higher quality video provides for a smoother video that should reduce video jitter and other undesirable artifacts of the video stream that create undesirable sensitivity for users. The media server may request the second user device (e.g., the streamer) to adjust the video quality.

Returning to the example, the media server 202 applies a blurring visual modification 214 to the video to reencode and transmit to the user 207 with a framerate of 120 frames per second (which is increased from 30 frames per second). The transmitted video is now smoothed with the blur effect as shown at 216.

In some embodiments, the media server may apply the visual modification to the live stream of the camera feed of the second device transmitted to the plurality of device. For example, if the visual modification includes the video stream to apply a blur effect, the media server may apply the blur effect on the second device that is the live stream of the camera feed that is streaming to a plurality of users.

In some embodiments, based on a determination that the visual characteristics of a second portion of the video stream does not correspond to the at least one sensitivity setting for the user, the media server ceases application of the at least one visual modification to the stream. For example, if a portion of the video transmission corresponds to a sensitivity setting for the user, it is possible that a future portion of the video transmission may not correspond to this sensitivity setting. In this scenario, the media server reverts the video transmission to its state without the visual modification applied.

In some embodiments, the media server may retrieve, for the user of the user device, historical data comprising historical visual modifications applied for historical video streams. For example, the media server may retrieve information from a data structure where the media server applied a visual modification of blurring when an upward direction exceeded a sensitivity setting. In some instances, there may be significant data based on a viewing history of a user that includes thousands of hours of media content being viewed with corresponding historical visual modifications. The media server may then, based on the historical data, generate for display a suggestion to apply a historically utilized visual modification to the stream to adjust the visual characteristics. For example, the media server may, via a user interface, provide an option for selection to the user device to apply a previously used visual modification. Upon a positive selection of the user interface received by the media server, the media server applies the historical visual modification for the specific sensitivity setting of the user.

Figure 4:
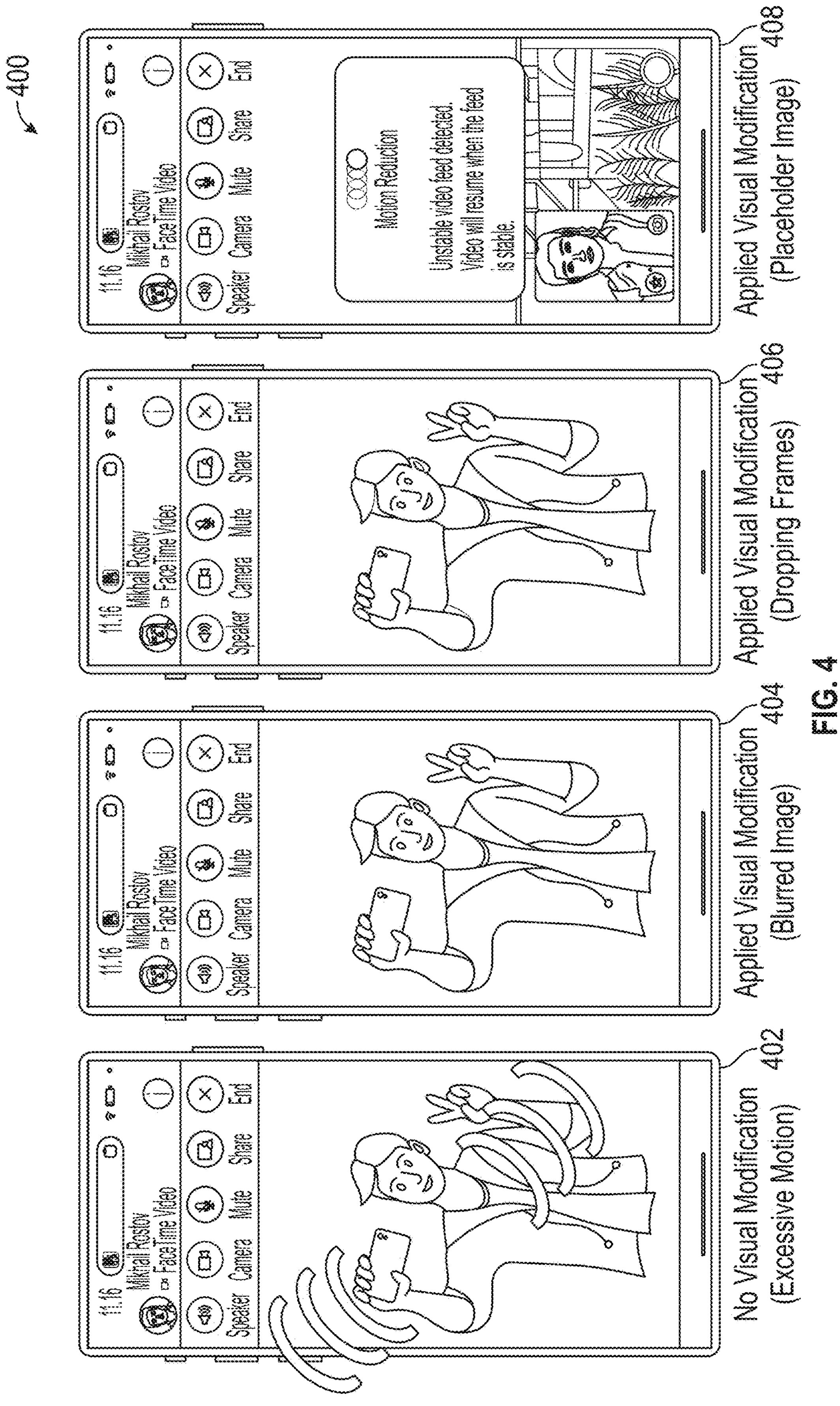
FIG. 4 shows an illustrative scenario in which a plurality of visual modifications is applied to the video stream, in accordance with some embodiments of this disclosure.

FIG. 4 shows an illustrative scenario 400 in which a plurality of visual modifications is applied to the video stream, in accordance with some embodiments of this disclosure. In some embodiments, the media server may determine whether that visual characteristics of the first portion of the video stream corresponds to a second sensitivity setting. The second sensitivity setting is a higher threshold indicative of a higher level of undesirability by feedback data from the user of the user device. For example, although a shaking scene in a movie of a vehicle moving erratically may corresponds to a first sensitivity setting as uncomfortable, it may also correspond to a second sensitivity setting as very uncomfortable. The media server may then cause at least a significant visual modification to be applied to the stream to adjust the visual characteristics for the duration of the first portion of the video stream. For example, a first portion of a video stream is shown at 402 with no visual modification applied. The media server may determine that this motion corresponds to both a first and second sensitivity settings. For a first sensitivity setting the applied visual modification may be a blurring effect as shown in 404. However, this is not sufficient as a second sensitivity setting is met and a more significant visual modification than blurring needs to be applied. In some embodiments, the significant visual modification may include dropping frames at shown at 406. In other embodiments, the significant visual modification may include applying a placeholder image in place of the first portion of the video stream with a notification such as "Unstable video feed detected. Video will resume when the feed is stable." as shown at 408.

In some embodiments, when determining that the visual characteristics of the first portion of the video stream corresponds to the at least one sensitivity setting for the user, the media server may receive an inertial measurement unit (IMU) sensor data from the second device that transmits the live stream. As mentioned earlier, the IMU sensor data may include data derived from accelerometers, gyroscopes, and/or magnetometers. For example, an IMU may be embedded in a smartphone that is being used as the second device to transmit a live stream video over the media server to other user devices. The media server may then analyze the IMU sensor data to determine that the visual characteristics of the first portion of the video stream corresponds to the at least one sensitivity setting for the user. Continuing with the example, the media server may analyze the IMU sensor data to determine whether the visual characteristics of the first portion of the video screen corresponds to the sensitivity setting of the user. This may be done by analyzing accelerations and coordinates at timestamps to determine if a threshold of motion in a particular direction has been exceeded, or if a frequency of a motion pattern has been exceeded.

In some embodiments, the first device (e.g., the user device receiving the video stream) may receive the IMU sensor data multiplexed to the first portion of the video stream from the second device (e.g., the streaming device). For example, when the first device receives the first portion of the video stream, it receives both the video data and the IMU data multiplexed. In some embodiments, the IMU sensor data related to one or more frames of the first portion of the video is received prior to the respective one or more frames of the first portion of the video. For example, if the video data relates to frame 30 of the video stream, the IMU data that is multiplexed sent with this video data includes IMU data for frame 31. In this way, the first device receives the IMU data for frame 31 prior to receiving the video data for frame 31. When the first device receives the video data for frame 31 multiplexed with IMU data, the IMU data would contain data for frame 32. In this embodiment, where the first device receives the video data multiplexed with the IMU data of the second device, the IMU data may be stored locally at device 1, or alternatively stored in either the media server or device 2.

Figure 5:
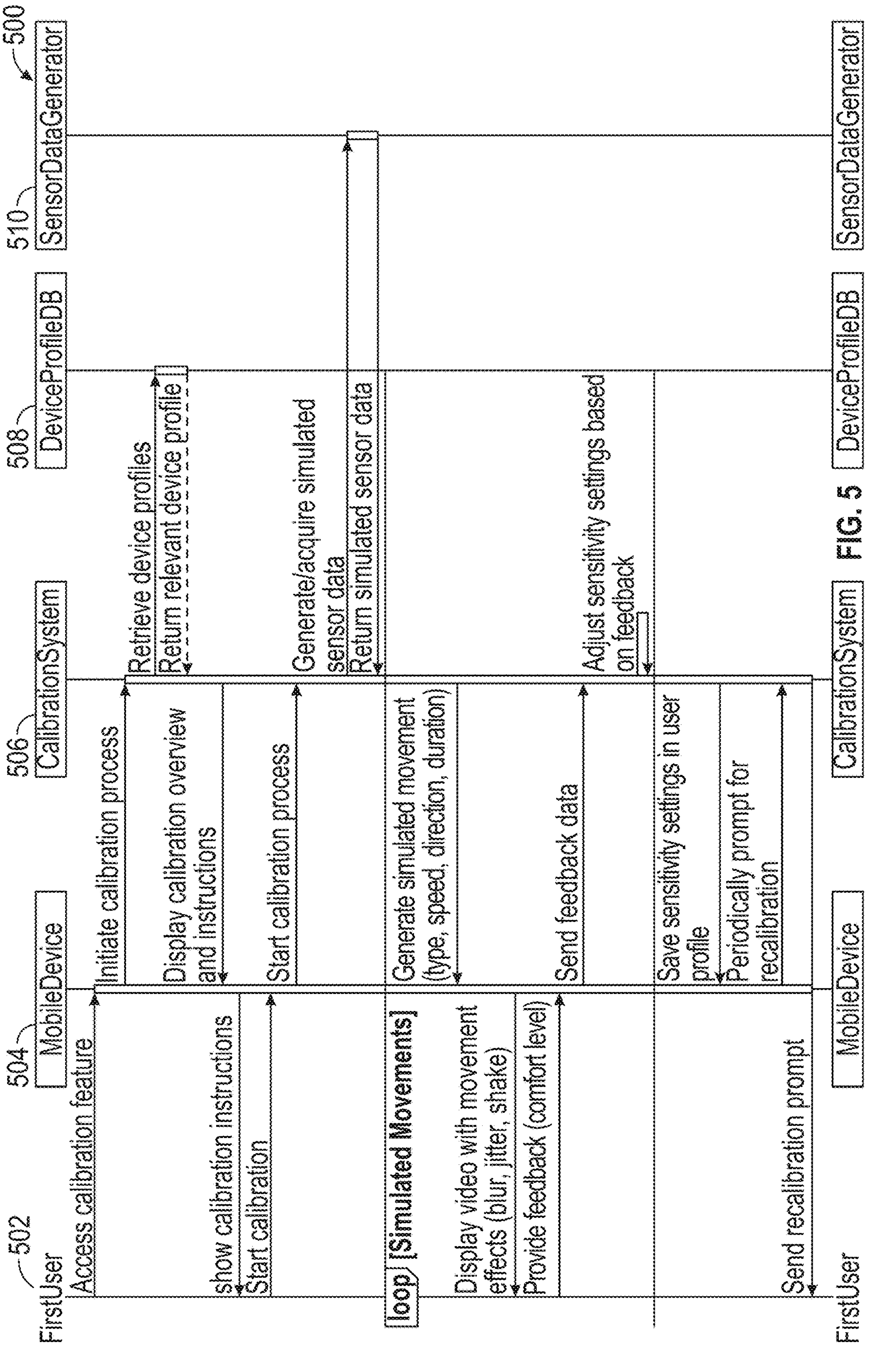
FIG. 5 is a sequence diagram of a detailed illustrative process for the media server performing sensitivity calibration of a user, in accordance with some embodiments of this disclosure.

FIG. 5 is a sequence diagram of a detailed illustrative process 500 for the media server performing sensitivity calibration of a user, in accordance with some embodiments of this disclosure. The system includes a first user 502, user device (e.g., mobile device) 504, a calibration system (e.g., a module of the media server) 506, a device profile data structure 508, and a sensor data generator 510. The media server may include a calibration feature (via the calibration system) that allows the first user to calibrate their motion sickness sensitivity in advance (similar to FIGS. 1A and 1B). The calibration process involves a series of tests that simulate different types of motion types (e.g., horizontal, vertical, rotational) and varying speeds as shown in FIG. 1B. During the calibration, the media server monitors the first user's responses to these motion types and determines their sensitivity settings. The first user may provide feedback during the calibration, indicating their comfort level with each movement. Based on this feedback, the media server automatically adjusts the sensitivity settings for the first user. The first user may access the calibration feature through a dedicated interface on their mobile device such a settings application, which may provide an overview of the calibration process, explaining its purpose and guiding the user through the necessary steps. The interface might also be part of a larger application for live streaming or teleconferencing. To account for different mobile devices from which the first user may receive live streams from, the media server maintains a database of device profiles. Each profile includes specific sensor characteristics such as accelerometer sensitivity, gyroscope accuracy, and other relevant details. When the first user begins the calibration, the media server selects a profile that corresponds to the most commonly used devices. This may ensure that the simulated data is realistic and relevant. Example device profile data might look like:

```
{
"device_model": "iPhone 12",
"accelerometer_sensitivity": "±2 g",
"gyroscope_sensitivity": "±250 dps",
"sampling_rate": "100 Hz"
}
```

The calibration process uses simulated sensor data to mimic various types of motion types. These motion types include horizontal shakes, vertical bounces, and rotational spins. The software generates these motion types at varying speeds and intensities to cover a wide range of scenarios. In some instances, the data may be pre-generated and transmitted to the device from another device or may be generated on the device. The simulated data is generated to reflect the characteristics of the selected device profile. Example simulated sensor data may take the following format:

```
{
"movement_type": "horizontal",
"speed": "2.5 m/s",
"direction": "left-right",
"duration": "5 seconds"
}
```

During the calibration, the media server generates for display a video to the first user. The video adjusts in real-time to reflect the plurality of motion types. The media server manipulates the video feed to appear blurry, jittery, or shaky according to the generated sensor data. The media server may implement graphics libraries such as OpenGL ES, Metal, or Vulkan to apply these visual effects dynamically or may be pre-applied on generic videos, existing videos within the user's image library or using a live camera feed of the first user's device. Blurring may be achieved by applying a Gaussian blur filter to the video frames, with the intensity of the blur correlating with the speed of the movement.

Video jittering simulates rapid, small movements and may be implemented by periodically shifting the video frame's position slightly based on the simulated data. Shaking mimics larger, more abrupt movements and may be achieved by periodically translating the video frame in a direction that corresponds to the simulated motion, using the generated data to determine the direction and intensity of the shake.

In addition to generating the calibration video on-device, the media server may utilize pre-created videos stored on the device or streamed from the cloud. These pre-created videos may be either generic calibration videos or videos belonging to the user profile of a user device, such as those from their personal library. This flexibility allows for a more varied and comprehensive calibration experience. For instance, if the user chooses a personal video, the media server may apply the same motion effects to this video, making the calibration process more relatable and effective. As the device simulates each movement, the media server uses this simulated data to create video effects that reflect the types of movements that might be experienced during a real streaming session. This enables the first user to gauge their sensitivity to different motion patterns without needing access to the actual sensors of a second user's device or video stream. After each simulated movement, the first user may be prompted to provide feedback through a user-interface. This interface may use elements like sliders or buttons to capture the user's level of discomfort, ranging from no discomfort to severe discomfort.

The media server processes the user's feedback in real-time, using the provided data to adjust the sensitivity settings dynamically. For example, if the user reports discomfort at a certain speed of horizontal movement, the media server lowers the sensitivity setting for such movements. The feedback processing might involve using machine learning libraries like TensorFlow Lite to make real-time adjustments. Based on the collected feedback, the media server may automatically adjust the motion sensitivity settings. For instance, if the first user indicates discomfort at moderate horizontal movements, the media server sets a lower threshold for horizontal movements, ensuring that similar real-world movements would trigger a response to mitigate motion sickness. Additionally, machine learning algorithms may be used to analyze the calibration data to identify patterns in the user's responses. In some embodiments, libraries like TensorFlow or PyTorch are used to provide algorithms that refine the sensitivity settings further. For example, the algorithms predict the first user's sensitivity to a broader range of movements based on the initial feedback, improving accuracy over time.

Once the calibration process is complete, the sensitivity settings are stored in the first user's profile. This data may be securely stored locally on the device using secure storage APIs or in the cloud using services like iCloud. The media server may periodically prompt the first user to verify their sensitivity settings to account for any changes in their motion sickness sensitivity over time. This adaptive feedback loop would ensure that the settings remain accurate and effective. APIs for push notifications or in-app prompts may be used to remind the user to recalibrate.

Figure 6:
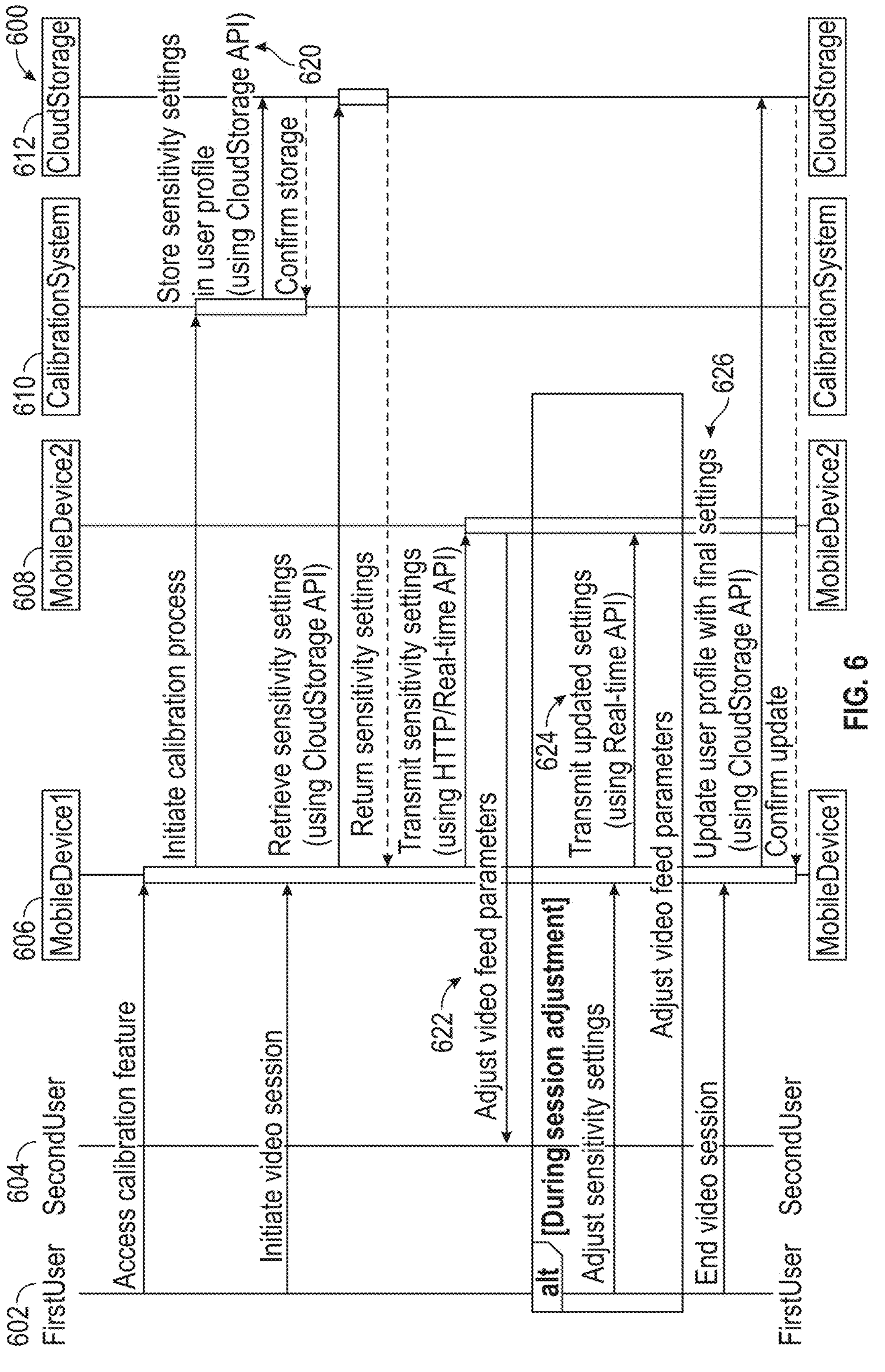
FIG. 6 is a sequence diagram of a detailed illustrative process for the media server updating a user profile after completing sensitivity calibration, in accordance with some embodiments of this disclosure.

FIG. 6 is a sequence diagram of a detailed illustrative process 600 for the media server updating a user profile after completing sensitivity calibration, in accordance with some embodiments of this disclosure. For example, in embodiments implementing live-streaming, calibration may be performed by mobile device 1 prior to the live-streaming (e.g., via express calibration video) or during the live-streaming (e.g., via real-time calibration). This system diagram includes a first user 602, a second user 604, mobile device 1 606, mobile device 2 608, a calibration system (as a module of the media server) 610, and cloud storage 612. In some embodiments, the media server enables the sensitivity settings to be stored in the user profile (e.g., a first user's profile). The media server may perform calibration, share and transmit these sensitivity settings before, during, or once a transmission of a video stream is initiated, ensuring that the second device is aware of the sensitivity settings. Initially, the sensitivity settings are calibrated and stored in the first user's profile, either locally on their device using a local storage API or in a cloud-based storage service using a cloud storage API at 620. When a video session is initiated, these settings are retrieved and transmitted to the second user's device to ensure the video feed (and the second device's monitoring of the feed and sensors) adheres to the first user's motion sensitivity preferences at 622. Before the video session begins, the first user's device may send the stored sensitivity settings to the second user's device using a data transfer API for HTTP communication or a real-time communication API for real-time updates. During the video session, if any adjustments are made to the sensitivity settings by the first user, these updates are dynamically transmitted to the second user's device using a real-time communication API at 624. This ensures that any changes in preferences are immediately reflected in the video feed stability, providing a real-time adaptation to the first user's comfort levels. After the video session, the media server may update the first user's contact information with the preferred sensitivity settings at 626. This involves saving the final sensitivity preferences in the user profile using a cloud storage API, which may be accessed in future sessions. This ensures that subsequent video sessions automatically adhere to these updated preferences without requiring recalibration.

In some embodiments, the media server includes a user interface that allows the first user to adjust their sensitivity setting preferences. The interface, via the media server, may provide options to set the degree of sensitivity to different motion types, such as horizontal, vertical, or rotational motions. The first user may also specify the desired response when the sensitivity setting is corresponded to, whether to pause the video feed or replace it with a placeholder image. In some embodiments, as a means of a visual modification, the paused video may be replaced with a placeholder image (either predetermined or captured during the time of motion) similar to FIG. 4 at 408. In some instances, computer vision techniques may be applied to select an image from a plurality of images captured during the time of unstable motion and video to be used as the placeholder image. In some instances, the image may come from a user's photo or image library. In other embodiments, the second user's information such as profile picture, name or other data may be overlaid on top of the placeholder image. Although in the description of FIG. 6, the media server is cited as the primary performer of the actions described above, the actions may be performed by the first device or the second device as shown in FIGS. 1C and/or 1D. In some embodiments, mobile device 1 may function as a media server.

Figure 7:
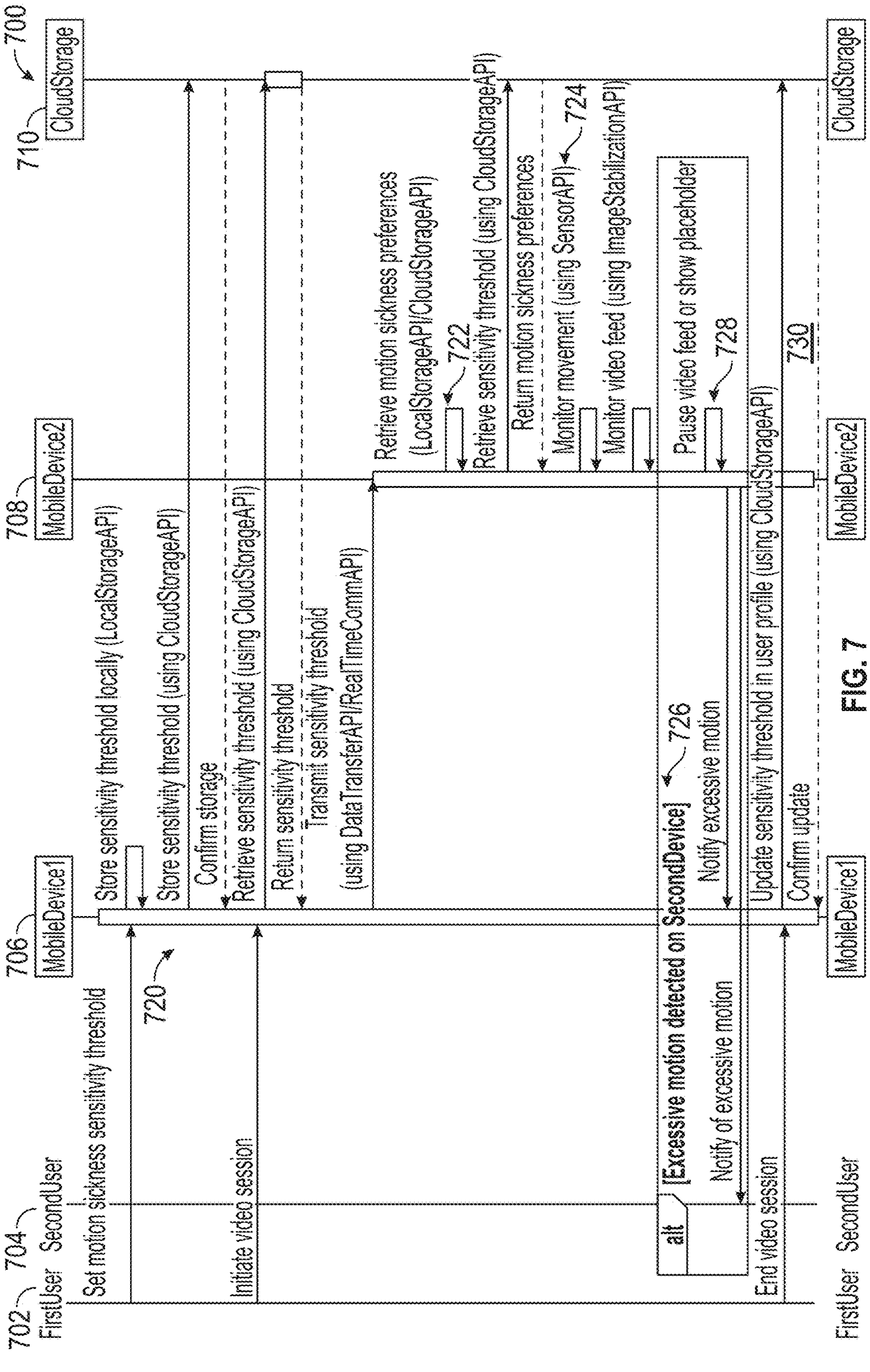
FIG. 7 is a sequence diagram of a detailed illustrative process for a second device detecting excessive motion, in accordance with some embodiments of this disclosure.

FIG. 7 is a sequence diagram of a detailed illustrative process 700 for a second device detecting excessive motion, in accordance with some embodiments of this disclosure. This system diagram includes a first user 702, a second user 704, mobile device 1 706, mobile device 2 708, and cloud storage 710. In some embodiments, the second device (e.g., streaming device) receives a first user's sensitivity setting threshold using a user interface on their device or via a calibration step as described in a previous embodiment at 720. When a video session is initiated, these settings are transmitted from the first mobile device to the second device at 722. This transfer may be implemented either from the transmitted data from the first device (during call initiation) or from the known user contact profile stored in the second user's device or the cloud. This ensures that the video feed and the second device's monitoring adhere to the first user's motion sensitivity settings. The second user's device may use data transfer APIs for HTTP communication or real-time communication APIs for persistent connections to retrieve these settings. During the video session, the second user's device continuously monitors its own movement using built-in sensors and image stabilization features at 724. If the device detects motion or video motion that exceeds the predefined threshold at 726, it takes immediate action to prevent discomfort to the first user. In some embodiments, the second device may apply a visual modification that includes at least one of blurring the video stream, dropping a number of video frames of the video stream, or up-sampling the video stream. In other embodiments, this involves pausing the video feed or replacing it with a placeholder at 728. This may be similar to FIG. 3 at 304. This pausing or replacing of the video feed from the second user may occur on the second device or the first device in a manner described in an above embodiment. The detection and response may be managed using sensor APIs to access accelerometer data and image stabilization features. The second device may perform these actions in real-time to maintain a comfortable viewing experience for the first user. After the video session, the second device may update the first user's profile (on the second user's device) with the latest sensitivity settings if any changes were made during the session at 730. Although in the description of FIG. 7, the second device is cited as the primary performer of the actions described above, the actions may be performed by the first device or the media server as shown in FIGS. 1C and/or 1D. In some embodiments, mobile device 2 may function as a media server.

Figure 8:
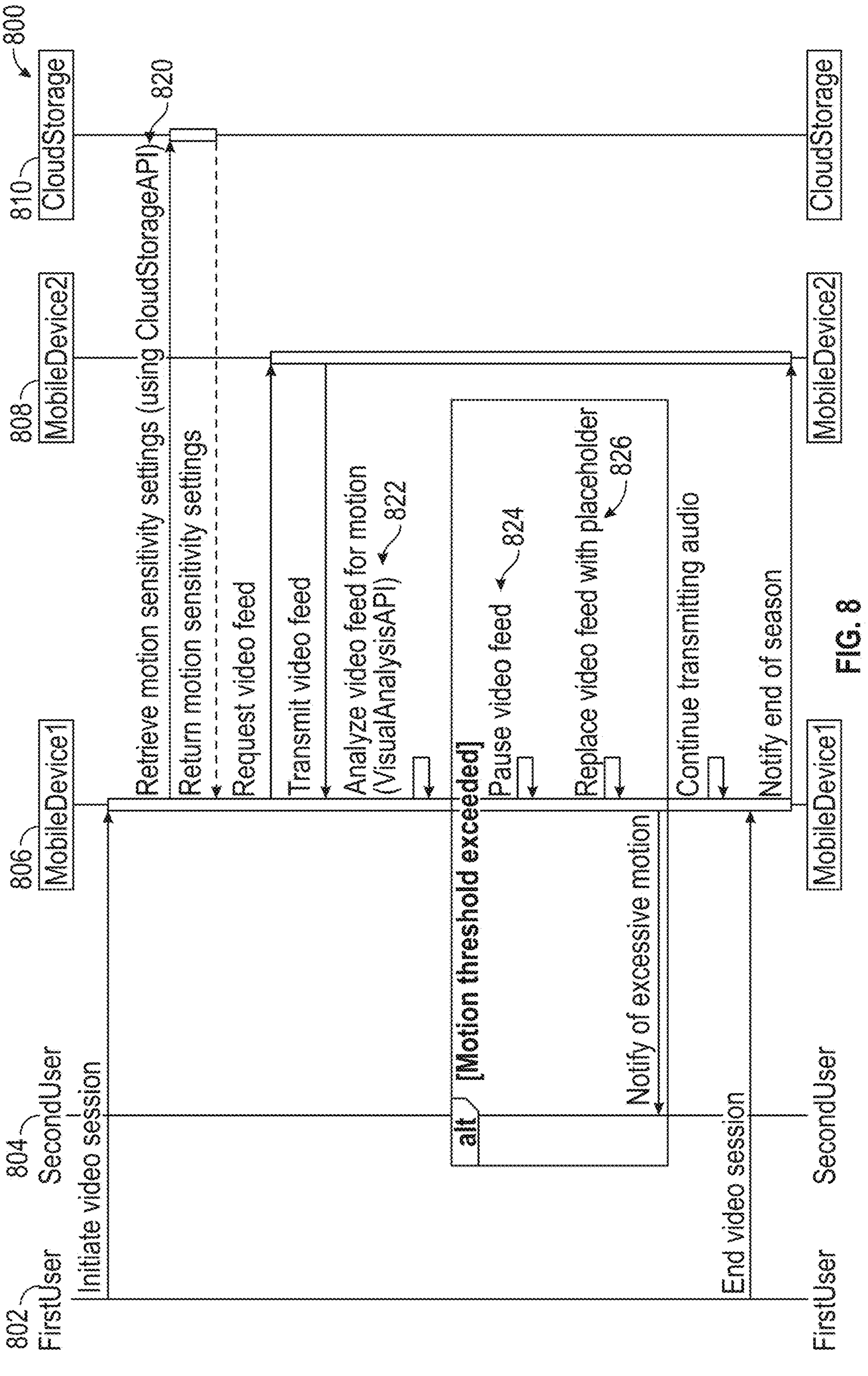
FIG. 8 is a sequence diagram of a detailed illustrative process for the media server applying a visual modification by placing a placeholder in place of the video stream, in accordance with some embodiments of this disclosure.

FIG. 8 is a sequence diagram of a detailed illustrative process 800 for the media server applying a visual modification by placing a placeholder in place of the video stream, in accordance with some embodiments of this disclosure. This system diagram includes a first user 802, a second user 804, mobile device 1 806, mobile device 2 808, and cloud storage 810 Upon initiation of a live stream with a second user or second device, the first user device analyzes the incoming video feed from the second user device to determine if the first user's motion threshold has been exceeded at 822. As the first device does not have access to the second device's sensors and image stabilization data, it may rely on visual analysis of the video feed. This may involve detecting blurring, shaking, or rapid movements within the video frames. If the analysis on the first user's device determines that the motion exceeds the predefined sensitivity setting in any category or direction, the first user's device may automatically pause the video feed while continuing to transmit audio 824. The paused video may be replaced with a placeholder image (as described in other embodiments, namely FIG. 3 at 304), and a notification may be transmitted to inform the second user of the excessive motion at 826. This ensures that the first user's comfort is prioritized, allowing them to control their own viewing experience directly. Although in the description of FIG. 8, the first device is cited as the primary performer of the actions described above, the actions may be performed by the media server or the second device as shown in FIGS. 1C and/or 1D. In some embodiments, mobile device 1 may function as a media server.

Figure 9:
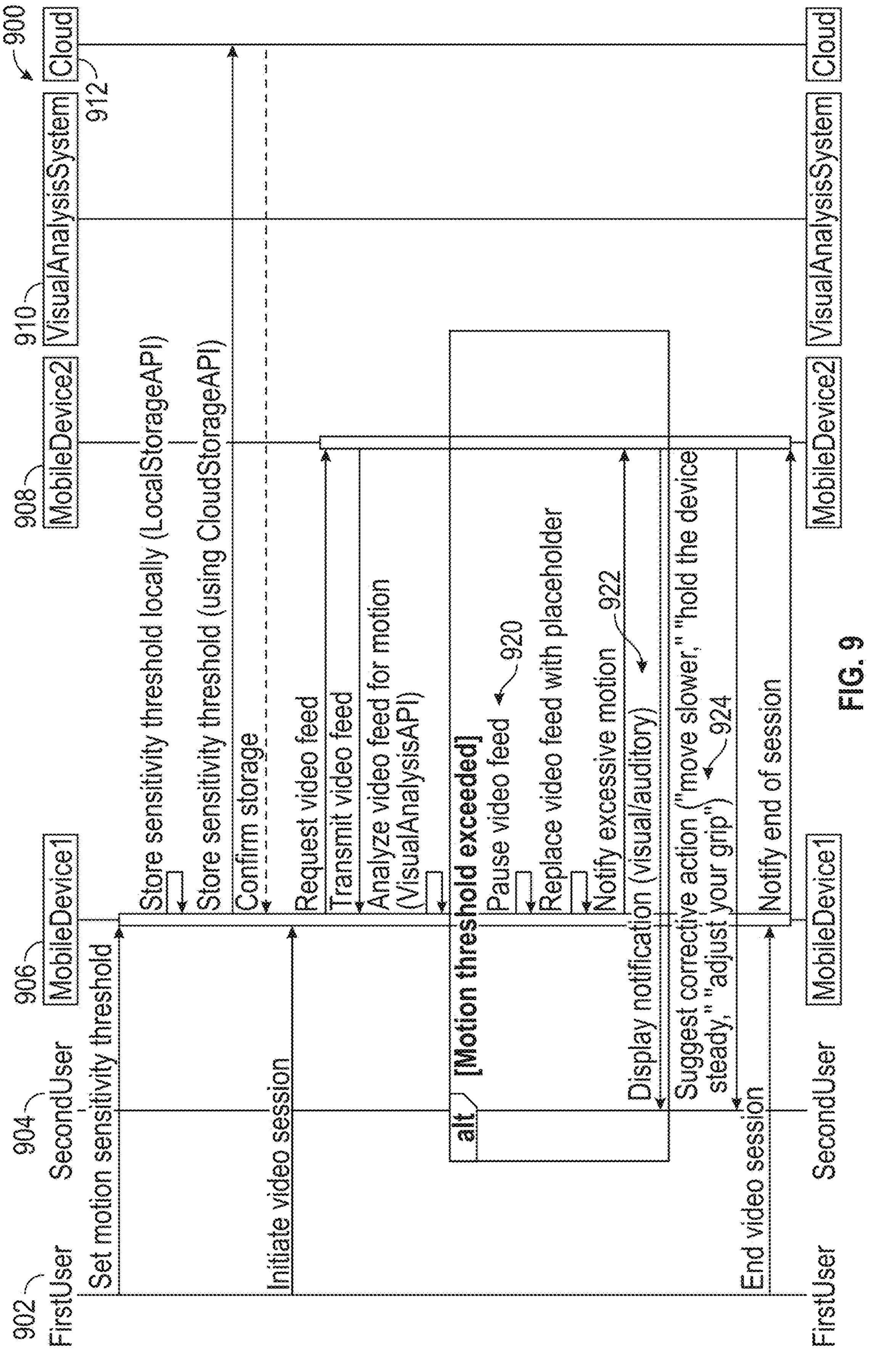
FIG. 9 is a sequence diagram of a detailed illustrative process for the first device detecting excessive motion, in accordance with some embodiments of this disclosure.

FIG. 9 is a sequence diagram of a detailed illustrative process 900 for the first device detecting excessive motion, in accordance with some embodiments of this disclosure. This system diagram includes a first user 902, a second user 904, mobile device 1 906, mobile device 2 908, visual analysis system 910, and cloud 912. In some embodiments, upon detecting motion beyond the sensitivity setting or upon receipt of a notification from a first device at 920, the first device causes the second device to display a real-time notification to inform the second user that their movements are causing instability at 922. This notification may be visual or auditory, prompting the second user to slow their movements or stabilize the device. The notification may suggest specific actions such as "move slower," "hold the device steady," or "adjust your grip," thereby helping the second user to maintain a stable video feed at 924. This is similar to FIG. 3 at 304 where the notification states "Try moving your phone more slowly to continue streaming." Although in the description of FIG. 9, the first device is cited as the primary performer of the actions described above, the actions may be performed by the media server or the second device as shown in FIGS. 1C and/or 1D. In some embodiments, mobile device 1 may function as a media server.

Figure 10:
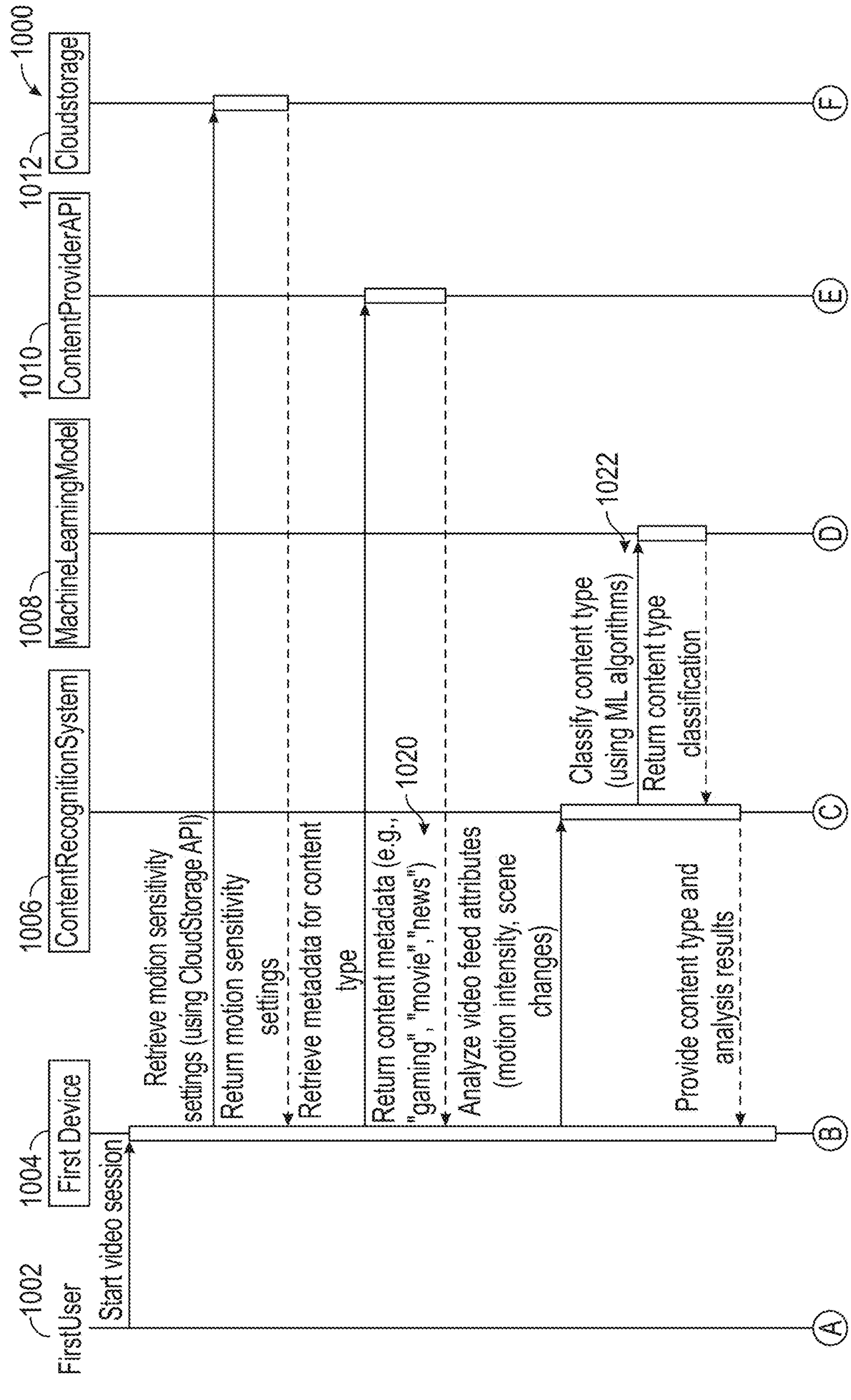
FIG. 10 is a sequence diagram of a detailed illustrative process for the first device determining a content type for a video stream, in accordance with some embodiments of this disclosure.
Figure 10:
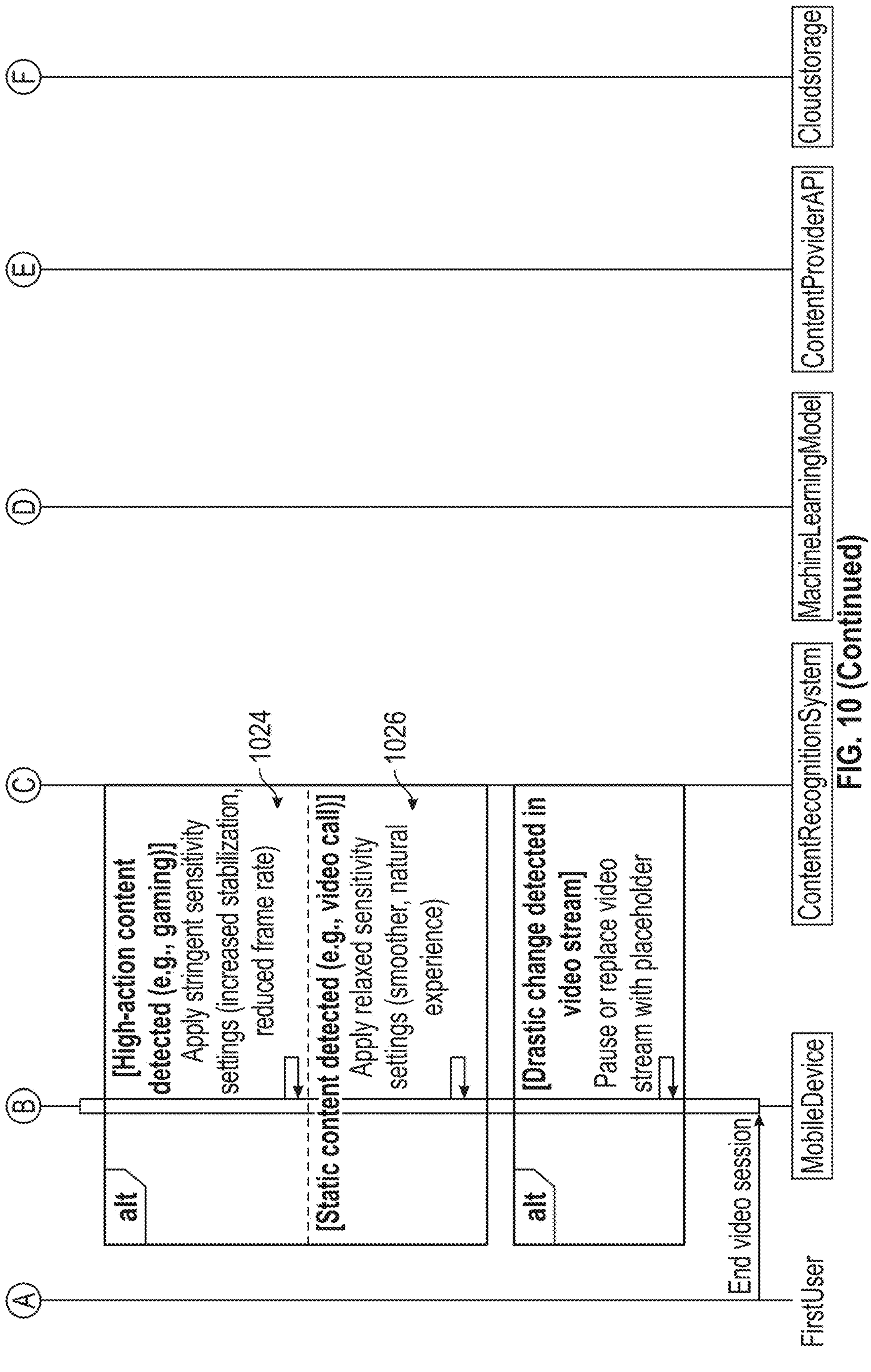

FIG. 10 is a sequence diagram of a detailed illustrative process 1000 for the first device determining a content type for a video stream, in accordance with some embodiments of this disclosure. This media server diagram includes a first user 1002, a first device 1004, content recognition system 1006 (performed by the media server), machine learning model 1008 (performed by the media server), content provider API 1010 (performed by the media server), and cloud storage 1012. In some embodiments, the first device at 1004 considers and adjusts the motion sensitivity settings based on the specific type of content being viewed. This enables the first device to differentiate between various types of content, such as high-action gaming streams and static video calls and apply appropriate sensitivity settings to each. For instance, the first device may implement more stringent sensitivity settings for high action gaming streams where rapid movements are common and more relaxed settings for static video calls where motion is minimal. The first device may use machine learning algorithms and content recognition techniques to categorize the type of content being viewed at 1022. These algorithms analyze various attributes of the video feed, such as motion intensity, frequency of scene changes, and overall visual activity. For example, high-action gaming streams typically exhibit rapid scene changes and high motion intensity, which may be detected by analyzing frame-by-frame changes in the video feed. On the other hand, static video calls usually show minimal movement and steady scenes, which the media server may identify through a lack of significant changes between frames. Additionally, the first device may leverage metadata and contextual information from the content provider (in the case of a non-live stream). For example, streaming platforms often tag their content with categories such as "gaming," "movie," or "news" as shown at 1020. The first device may access this metadata through APIs provided by the streaming platforms to automatically adjust the sensitivity settings based on the content category. Once the type of content is identified, the first device adjusts the motion sensitivity settings accordingly. For high-action gaming streams, the first device might apply more aggressive motion stabilization techniques, such as increased image stabilization and reduced frame rates, to mitigate the impact of rapid movements as they are correlated to the first user's motion sickness threshold (as described in other embodiments) at 1024. Conversely, for static video calls, the first device might relax these settings, allowing for a smoother and more natural viewing experience at 1026. In either case, the first device may detect a drastic change in the overall video stream and pause or replace the video stream (as described in other embodiments). Although in the description of FIG. 10, the first device is cited as the primary performer of the actions described above, the actions may be performed by the media server or the second device as shown in FIGS. 1C and/or 1D. In some embodiments, the first device may function as a media server.

Figure 11:
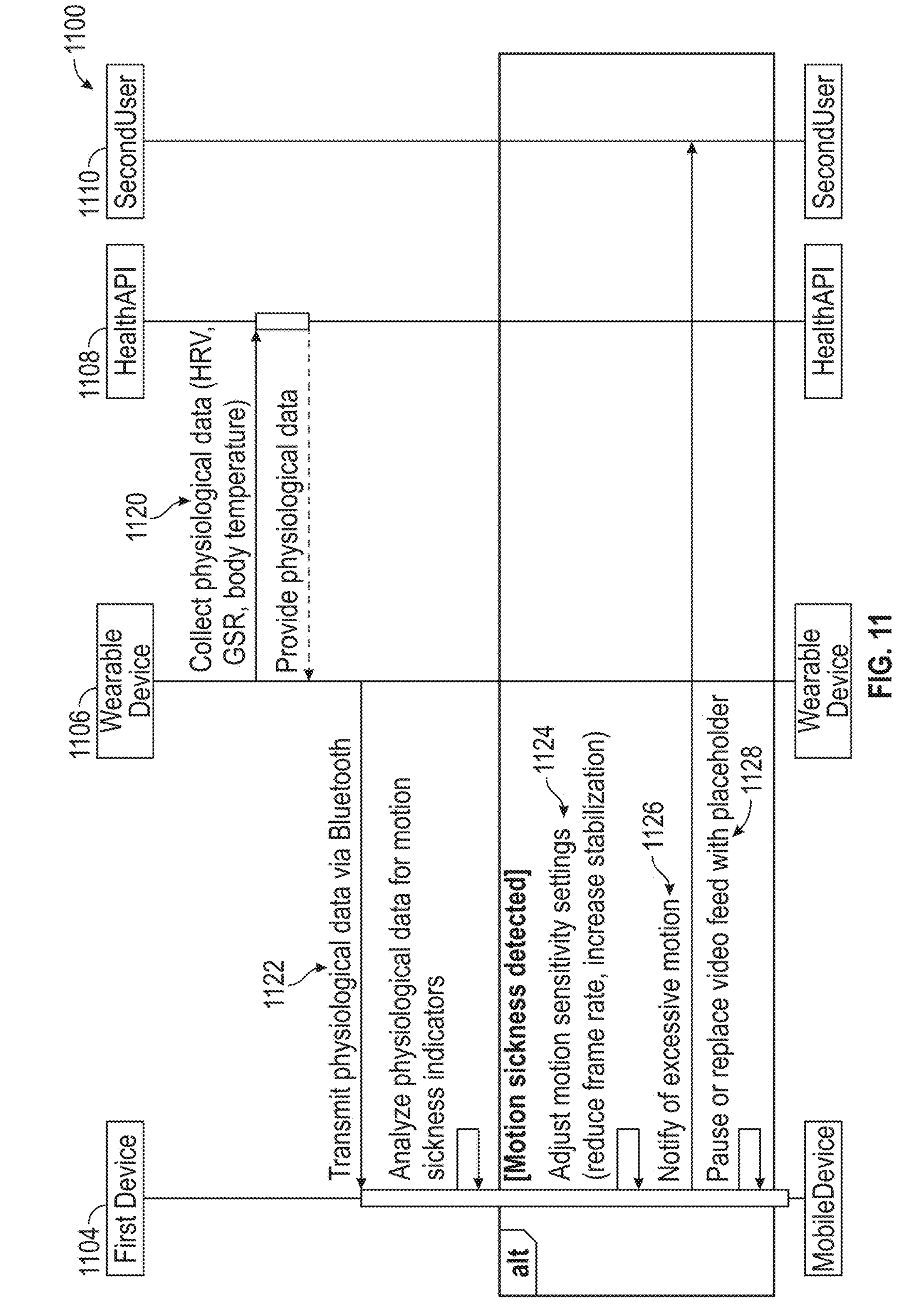
FIG. 11 is a sequence diagram of a detailed illustrative process for the first device determining biometric data indicating motion sickness for a user of a user device, in accordance with some embodiments of this disclosure.

FIG. 11 is a sequence diagram of a detailed illustrative process 1100 for the first device determining biometric data indicating motion sickness for a user of a user device, in accordance with some embodiments of this disclosure. This first device diagram includes a first device 1104, a wearable device 1106, a health API 1108, and a second user 1110. In some embodiments, the first device integrates with wearable devices such as smartwatches or fitness trackers to monitor physiological signals that indicate motion sickness in a process known as photoplethysmography (PPG) at 1120. These signals may include but are not limited to heart rate variability (HRV), skin conductivity or galvanic skin response (GSR), and body temperature. Wearable devices may use PPG sensors to measure HRV by detecting blood volume changes in the microvascular bed of tissue. An increase in HRV, detected by fluctuations in heart rate, may indicate the onset of motion sickness. Wearables equipped with GSR sensors measure the electrical conductance of the skin, which varies with its moisture level. An increase in skin conductance is often associated with heightened emotional or physiological arousal, such as the onset of motion sickness. Additionally, body temperature may be monitored using thermistors or infrared sensors on wearable devices. Sudden changes in body temperature, particularly a rise in skin temperature, may be correlated with motion sickness symptoms. When the wearable device detects physiological changes that correlate with motion sickness at, the data may be transmitted to the first user's mobile device via Bluetooth or another wireless communication protocol at 1122. APIs like Apple's HealthKit or Google Fit may facilitate the integration of wearable data into the system. Upon the motion sickness detected, the mobile device may adjust the motion sensitivity settings by applying a visual modification at 1124, and notify the second user (e.g., the streamer) of excessive motion at 1126 (e.g., similar to FIG. 3 at 304). This may include pausing the video stream or applying a placeholder image at 1128 as a visual modification as discussed in previous embodiments (e.g., see FIG. 4 at 408). The system may process this data in real-time to adjust the motion sensitivity settings dynamically. Although in the description of FIG. 11, the first device is cited as the primary performer of the actions described above, the actions may be performed by the media server or the second device as shown in FIGS. 1C and/or 1D. In some embodiments, the first device 1 may function as a media server.

In an embodiment, the media server may provide historical data analysis and feedback to the first user. This feature allows the first user to view instances where the sensitivity setting correspond, enabling them to refine their sensitivity settings for future live streaming or teleconferencing sessions. The historical data may be presented to help the first user to better understand their motion sensitivity patterns and make informed adjustments.

In an embodiment, the media server may provide a customizable notification system for the first or second user devices. The media server may provide, via user interface, the first or second user with selections of various alert options, such as visual cues on the screen, vibration alerts, or audible notifications. This flexibility would ensure that the alerts are effective and unobtrusive, allowing the second user to quickly take corrective action without disrupting the live streaming or teleconferencing session.

Figure 12:
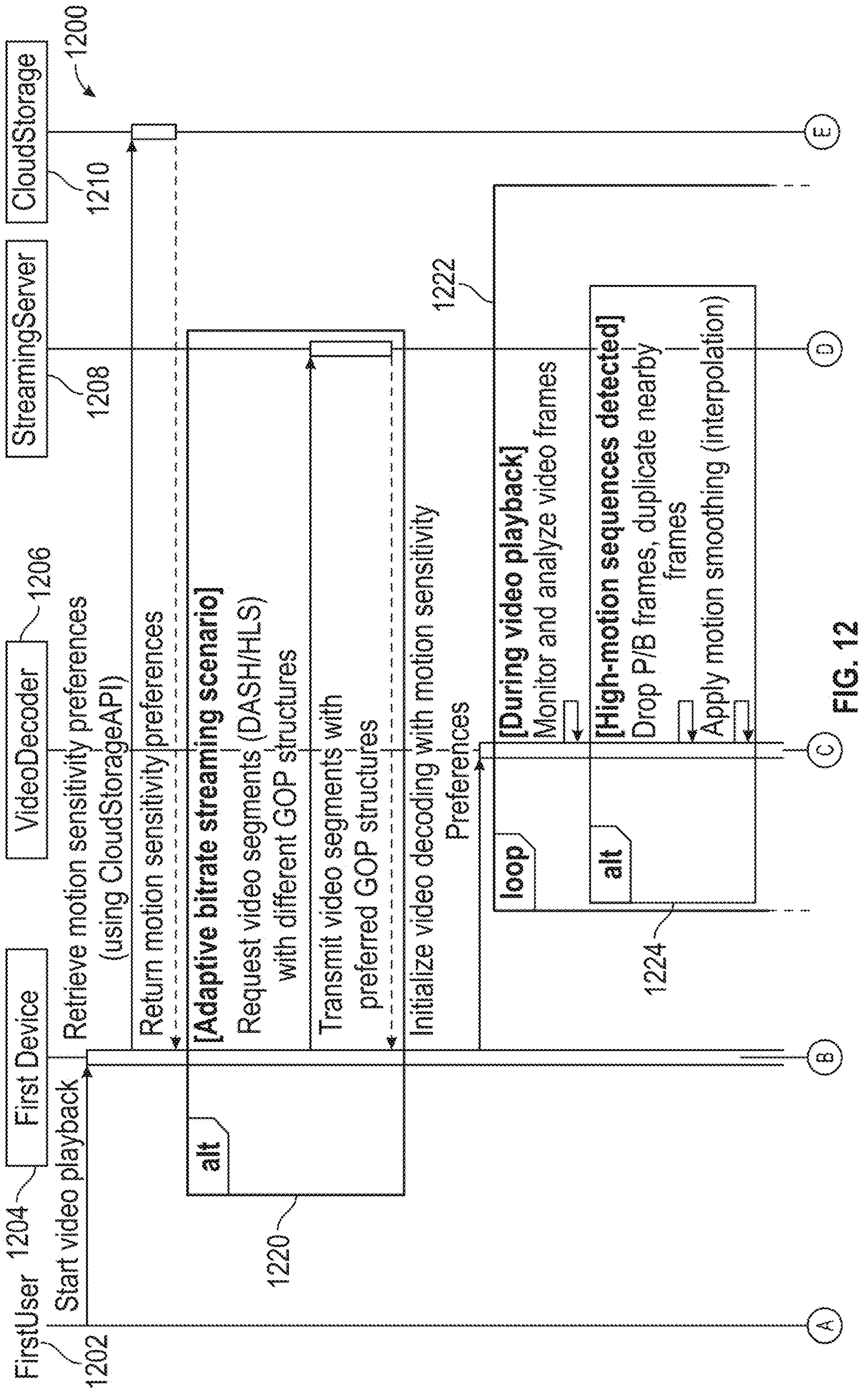
FIG. 12 is a sequence diagram of a detailed illustrative process for the media server applying a visual modification to the video stream using adaptive bitrate streaming, in accordance with some embodiments of this disclosure.
Figure 12:
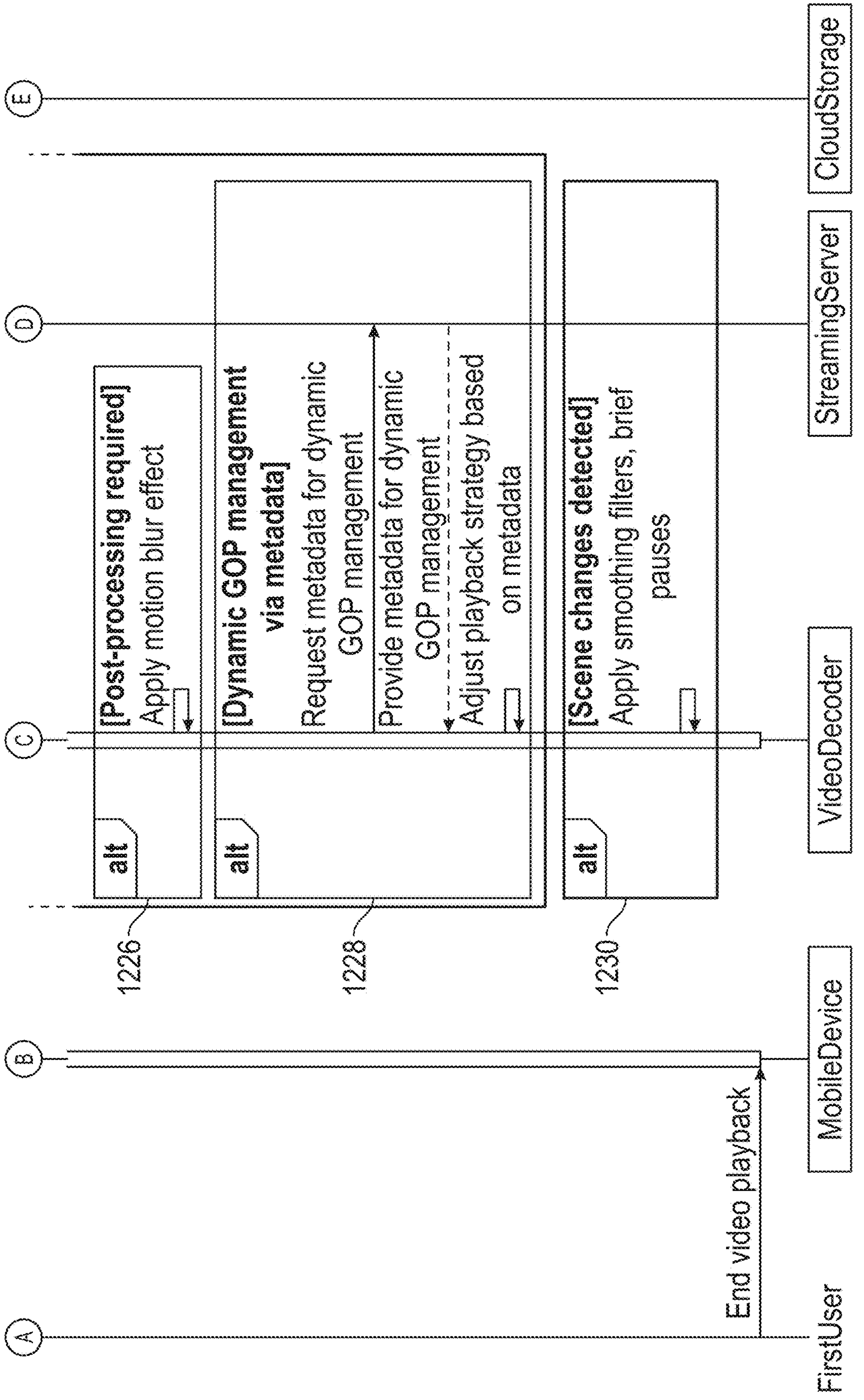

FIG. 12 is a sequence diagram of a detailed illustrative process 1200 for the first device applying a visual modification to the video stream using adaptive bitrate streaming, in accordance with some embodiments of this disclosure. This media server diagram includes a first user 1202, a first device 1204, a video decoder 1206, a streaming server 1208, and cloud storage 1210. In some embodiments, the first device dynamically adjusts the decoding and playback of videos to reduce motion sickness based on a user's calibrated motion sensitivity preferences. The preferences are used to determine preferred frame rate settings, stabilization intensities, and thresholds for different types of motion and content such as motion intensity, motion smoothing, and tolerance for scene changes. The first device may use these thresholds to dynamically adjust decoding parameters in real-time. Some examples of adjusting decoding parameters which are correlated to a user's motion sickness threshold are frame dropping and duplication, where the decoder may selectively drop certain P or B frames (predictive or bidirectional frames) and duplicate nearby frames when high-motion sequences are detected. This technique may reduce the perceived motion intensity without requiring new I-frames. Additionally, motion smoothing may be applied by using interpolation methods to generate intermediate frames between existing frames. This may create smoother transitions without altering the group of pictures (GOP) structure, aiding in the reduction of motion sickness. Post-processing may also be used, where effects such as motion blur are applied to the rendered frames after decoding. These effects make the video appear smoother and less jittery. Additionally, the first device may leverage dynamic GOP management via metadata, where if the video stream includes sufficient metadata or if the decoder may communicate with a backend server providing such metadata, the decoder may dynamically manage playback strategies. For example, during high-motion scenes, the decoder may buffer frames more aggressively, using a combination of existing I-frames and interpolated frames to manage transitions based on upcoming content. Where a user's motion sickness preference indicates a discomfort with sudden changes, a decoder when detecting scene changes (often associated with an I-frame), may adjust its playback strategy by applying smoothing filters or brief pauses to reduce the impact of sudden changes. Although the decoder cannot insert new I-frames, it may optimize the handling of existing I-frames for a smoother transition. In adaptive bitrate streaming scenarios, such as DASH or HLS, the decoder may request portions with different GOP structures at 1220. For instance, if a user profile indicates a user has a low threshold for motion sickness, the decoder may request portions with shorter GOPs from the streaming server, ensuring more frequent I-frames which may provide stable reference points for motion sickness reduction techniques. During video playback, the video decoder, a module of the first device, may monitor and analyze video frames at 1222, selectively drop certain P or B frames at 1224 and apply motion smoothing, or apply a motion blur at 1226, or adjust playback based on provided metadata at 1228, or apply a smoothing filter at 1230. Although in the description of FIG. 12, the first device is cited as the primary performer of the actions described above, the actions may be performed by the media server or the second device as shown in FIGS. 1C and/or 1D. In some embodiments, the first device (or video decoder) may function as a media server.

Figure 13:
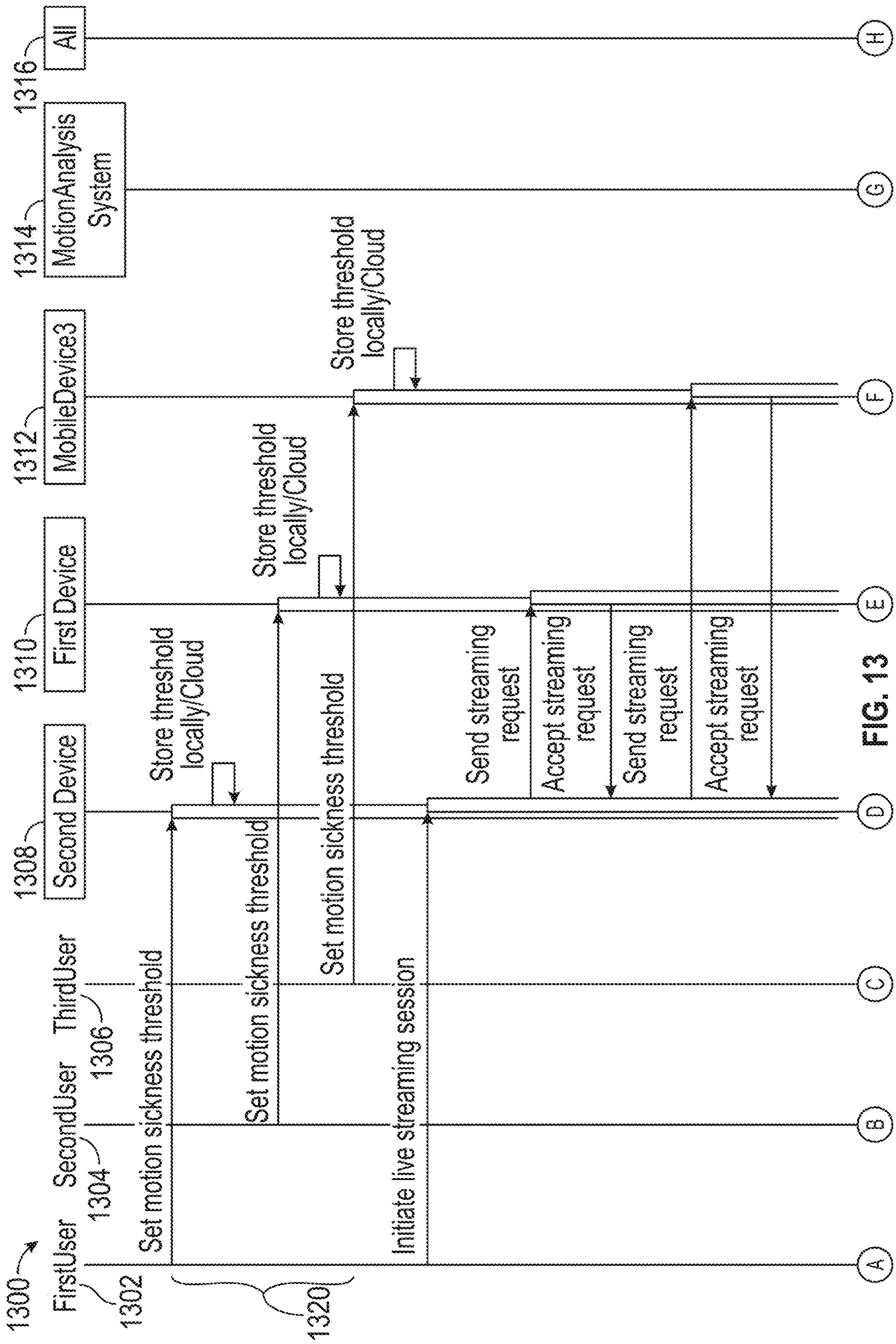
FIG. 13 is a sequence diagram of a detailed illustrative process for the media server applying multiple sensitivity settings for multiple users, in accordance with some embodiments of this disclosure.
Figure 13:
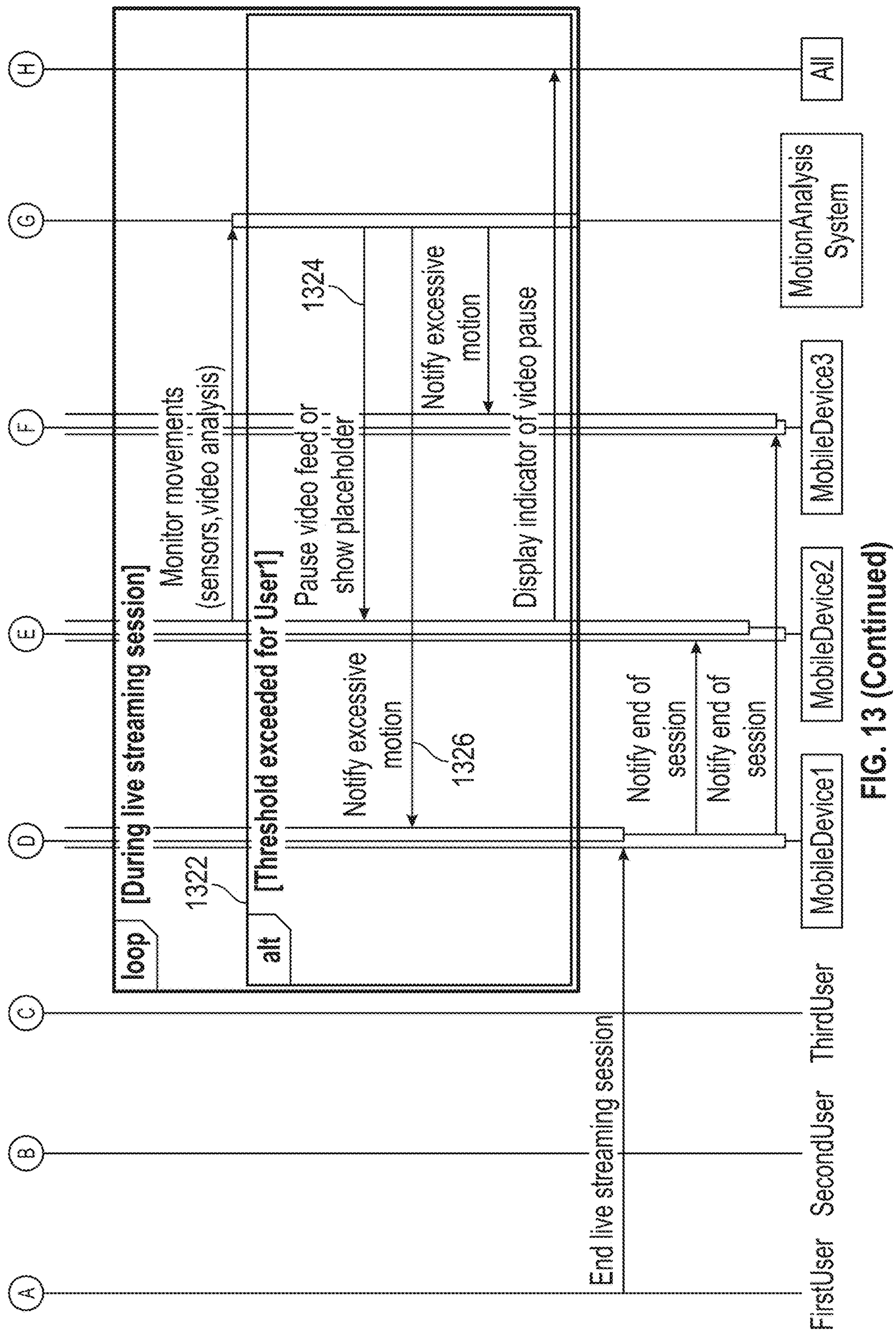

FIG. 13 is a sequence diagram of a detailed illustrative process 1300 for the media server applying multiple sensitivity settings for multiple users, in accordance with some embodiments of this disclosure. This media server diagram includes a first user 1302, a second user 1304, a third user 1306, a second device 1308, a first device 1310, a third mobile device 1312, and motion analysis system 1314, and all devices 1316. In some embodiments, the first device accommodates multiple users and devices participating in a live streaming session. Each user may have different sensitivity settings thresholds set on their respective devices at 1320. When the second user's device movements correspond to any one participant's sensitivity settings at 1322, the second device may apply the relevant visual modifications, such as pausing the video feed or displaying a placeholder image at 1324. Additionally, the second device may provide a notification to all participants that the transmitted video stream has been paused for one or more users due to excessive motion at 1326. This indicator ensures transparency and allows all participants to be aware of the reason for any interruptions in the video stream, thereby maintaining the integrity of the session. Although in the description of FIG. 13, the second device is cited as the primary performer of the actions described above, the actions may be performed by the media server or the first device as shown in FIGS. 1C and/or 1D. In some embodiments, the second device may function as a media server.

In some embodiments, the media server supports multiple users on a single device by allowing each user to create a personalized profile with their unique motion sensitivity settings. This allows for multiple users to share the same device for streaming or conferencing. Each profile may be activated through various methods including but not limited to simple profile switching, biometric data (fingerprint or facial recognition), or through linked accounts like Google or Apple IDs.

In some embodiments, the sensitivity settings data from the first user may be sent, via the media server, to the second device of the second user. Upon the media server determining that the transmitted video corresponds to the first user's sensitivity setting, the second user (e.g., streamer) may take an action and alter the video it transmits to the first user. It may for example suspend sending the video or attempt at mitigating the motion effect of the video. In another example, the second device may always transmit the video unaltered to a plurality of first devices but it may attach sensing data indicating the level of motion in the transmitted video. It may for example, attach normalized accelerometer and gyroscope data. In another example it may process the video and attempt to detect motion before sending it. Upon detection of motion, it may attach to the video the level of detected motion. The second device may include the additional metadata as a separate set of files within an ABR playlist (such as JSON files) whose content indicates motion information for all sections of the video included in the playlist. It may include motion information for a particular timeframe of a particular chunk of video. Upon receiving that metadata, the first device may then compare the motion information to the sensitivity settings of the first user and take an action if it detects that it exceeds these thresholds. As previously mentioned, the action for example may be to suspend the playback of the video while maintaining the audio unchanged. It may also be altering the video to mitigate the effects of motion in the video. In some other examples, the motion IMU metadata may be multiplexed into the video stream as an MPEG7, KLV, or SEI (special parameter that is specified for H. 264 and H. 265 that may be used to specify how the frame should be displayed) metadata stream.

Figure 14:
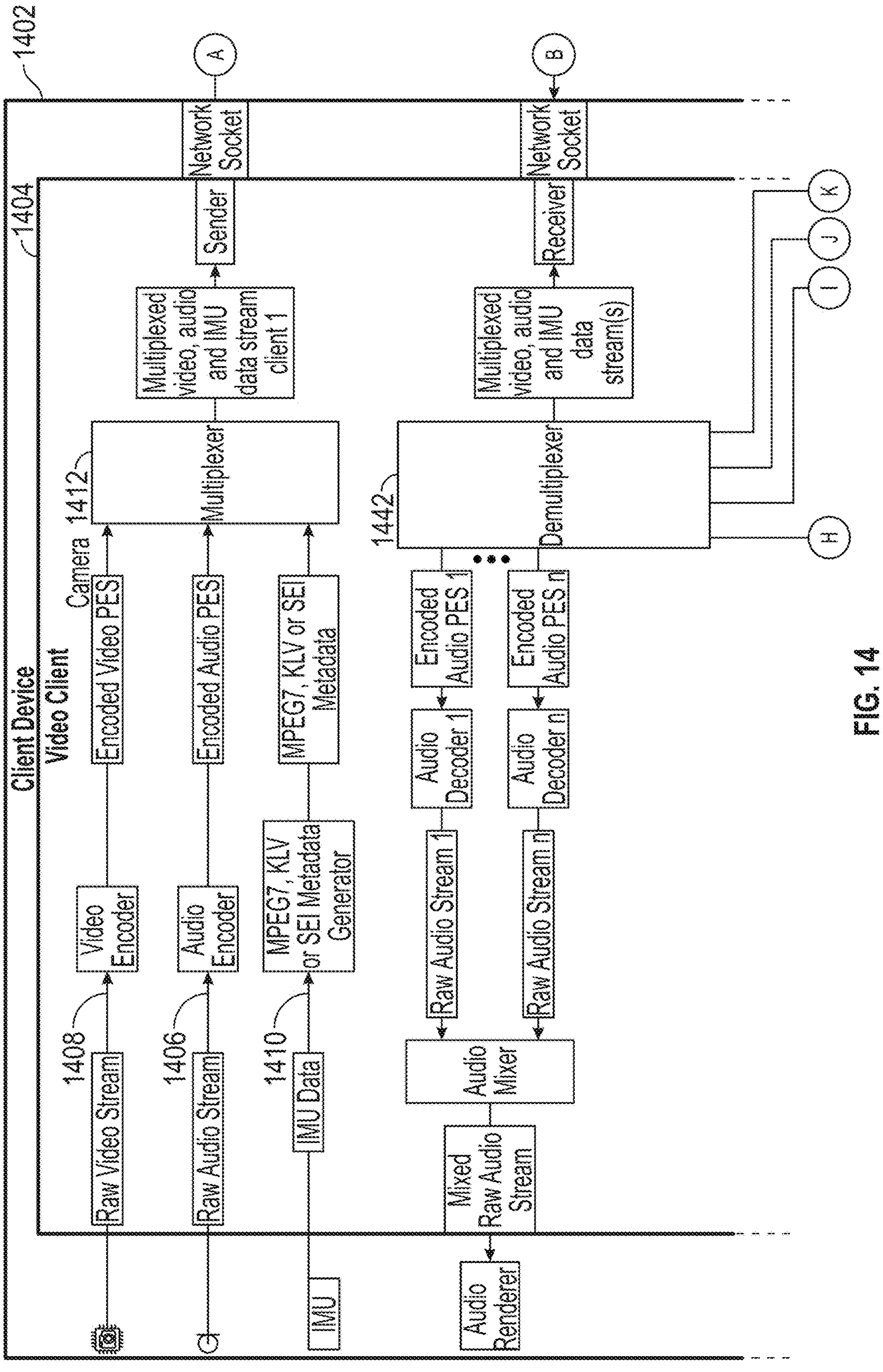
FIG. 14 is a system diagram for multiplexing IMU data to be analyzed by the media server, in accordance with some embodiments of this disclosure.
Figure 14:
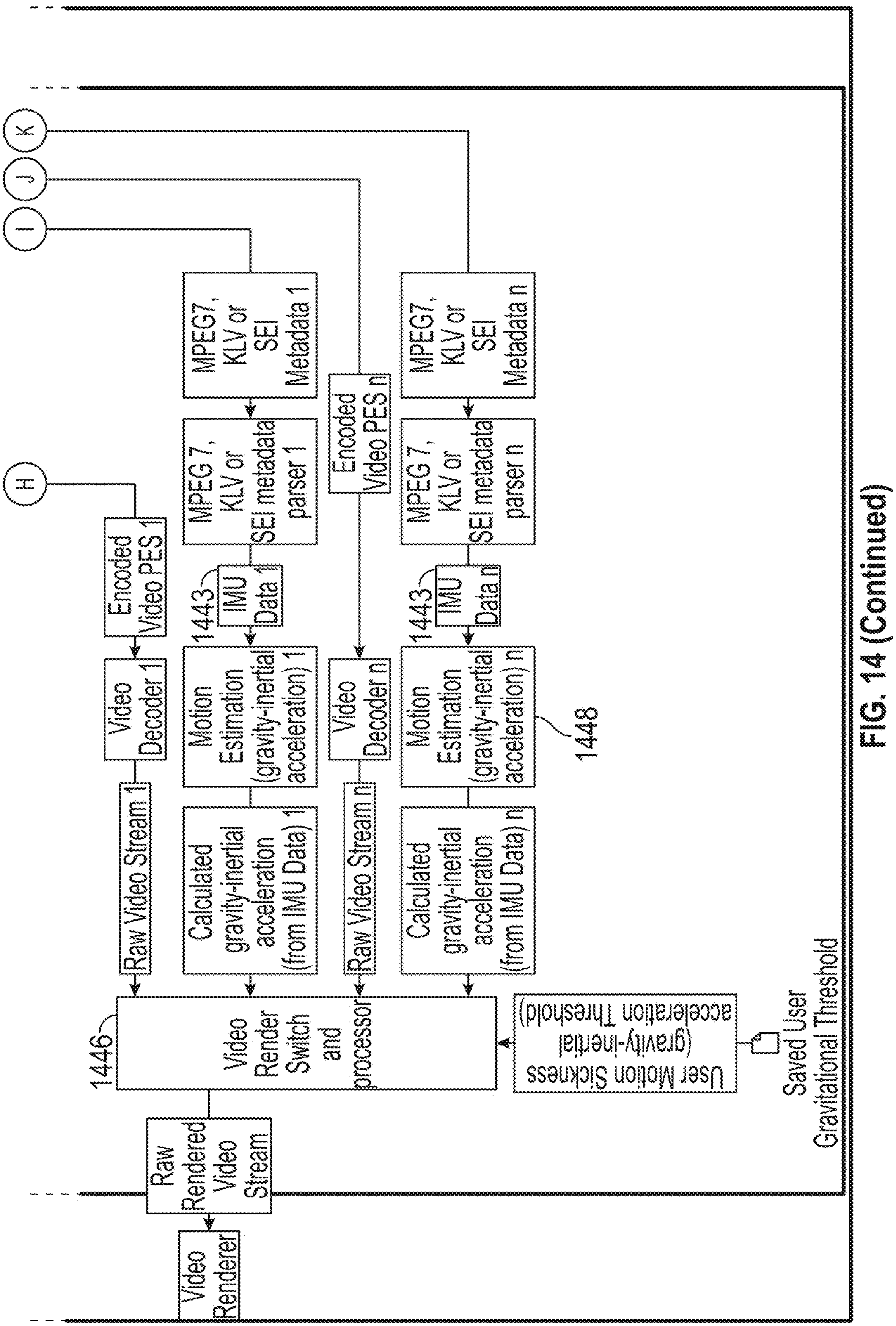
Figure 14:
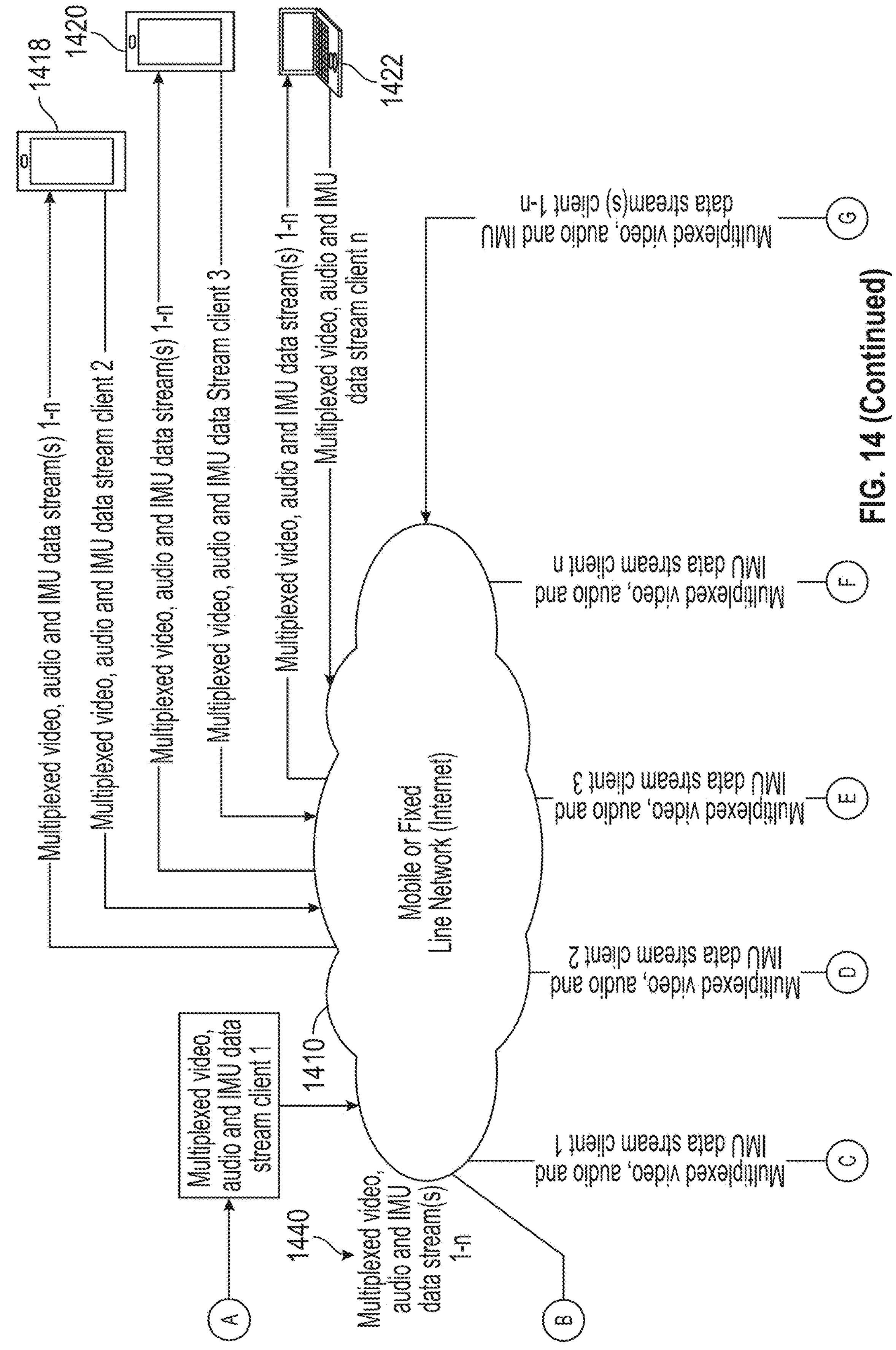
Figure 14:
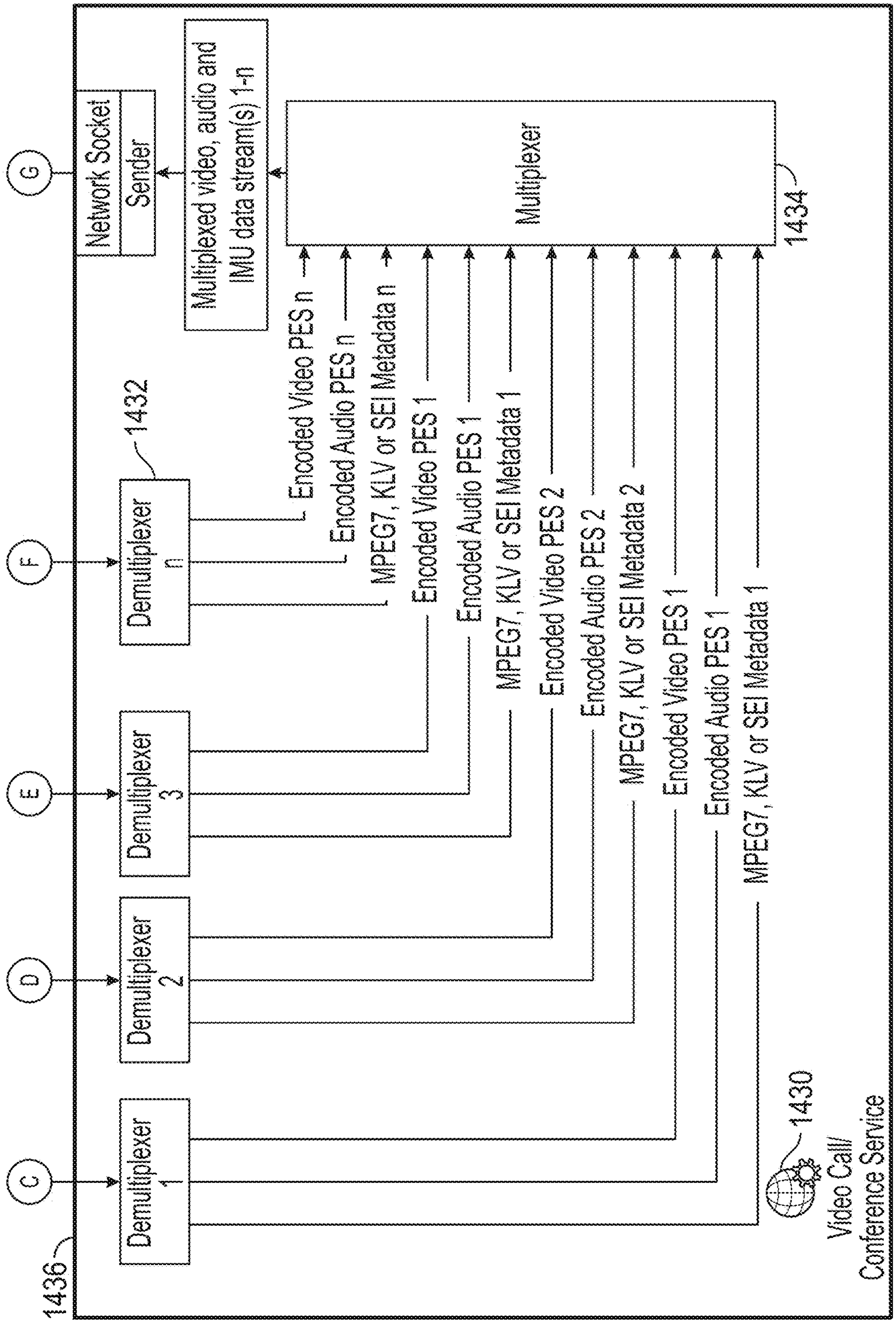

FIG. 14 is a system diagram 1400 for multiplexing IMU data to be analyzed by the media server, in accordance with some embodiments of this disclosure. This diagram is exemplary of a video conference/call system (e.g., implemented by the media server) that multiplexes the IMU data into the stream to be delivered to the client devices 1418, 1420, and/or 1422. The following video service system will work on a two-way video call as well as video conferencing. The system (e.g., implemented by the media server) receives the IMU data from the IMU sensor, the raw video stream from the camera and the raw audio stream from the audio capture device/microphone through mobile or fixed line network (e.g., internet) 1410.

1402 shows an expanded view of a client device where, via a video client 1404, the audio is encoded and sent to an audio encoder 1406. The video is encoded and sent to a video encoder 1408. The IMU data is sent to the MPEG 7, KLV or SEI Metadata Generator 1410. The video encoding introduces latency into the stream by 1-3 frames. The IMU data is sampled much faster than the video encoding and therefore the IMU MPEG 7, KLV or SEI metadata for a frame will be ahead of the video frame by 1-3 frames. The audio, video and IMU metadata is sent to a multiplexer which multiplexes the elementary streams into a format like MPEG2TS or into an RTP transport container at 1412. Since the IMU metadata, at 1443, is ahead of the video, this may be used to an advantage in the calculation allowing for the receiving client device of the sender to adjust the video rendering on a receiving device if the saved gravitational threshold is exceeded on the receiving device based on the receiving device's user preference setting prior to rendering the video stream exceeding the user's gravitational threshold. As stated in an example previously, if the video data relates to frame 30 of the video stream, the IMU data that is multiplexed sent with this video data includes IMU data for frame 31. In this way, the media server receives the IMU data for frame 31 prior to receiving the video data for frame 31. When the media server receives the video data for frame 31 multiplexed with IMU data, the IMU data would contain data for frame 32.

The multiplexed video, audio and IMU metadata stream is sent to the video/call conference service at 1430. The example video/call conference service covers n number of devices in a single session. The video call service demultiplexes each of the incoming streams from all the client devices at 1432. The demultiplexed video, audio and IMU metadata streams are sent to a multiplexer at 1434, like an MPEG 2 multiprogram transport stream multiplexer, and are multiplexed together to deliver to all the client devices in the video call/conference session at 1436.

The multiplexed stream is sent to all devices in the video call/conference at 1440. The MPEG2TS will have PES headers which will be associated with each user through unique identifiers. For incoming user 1, there will be a demultiplexed video PES (packetized elementary stream), audio PES and MPEG 7, KLV or SEI metadata stream at 1442. The video PES is sent to a video decoder. The audio PES is sent to an audio decoder. The MPEG7, KLV or SEI stream is sent to a motion estimation (gravitational acceleration) system. The same goes for user 2, user 3 up to user n. The decoded raw audio from each of the incoming user session audio decoders is fed into an audio mixer. The decoded raw video and the calculated gravitational acceleration value is sent to the video render switch and processor 1446. The purpose of the video render switch and processor is to render each of the video streams onto a rendered space as defined by a layout which is known in the art today and performed by video conferencing systems.

This video render switch and processor have now been expanded to accept the calculated gravity-inertial acceleration value on a per frame basis. As mentioned earlier, this gravity inertial acceleration value will be several frames ahead of the frame that the IMU data is associated with due to the video encoding latency. The calculated gravity-inertial acceleration value is compared to a user motion sickness (gravity-inertial acceleration threshold) at 1448. If calculated gravity-inertial acceleration value is greater than or equal to the user's gravity-inertial acceleration threshold, the video render switch and processor will switch to a secondary video/image render data for all users' video stream that exceed the user's gravity-inertial acceleration threshold. If any user's video rendering was not shown due to a gravity-inertial acceleration threshold and a new calculated gravity-inertial acceleration value is less than the user's gravity-inertial acceleration threshold, the media server may wait for a 1-3 frame delay before rendering the video for that user's rendering. This is to account for the video encoding/decoding latency.

Figure 15:
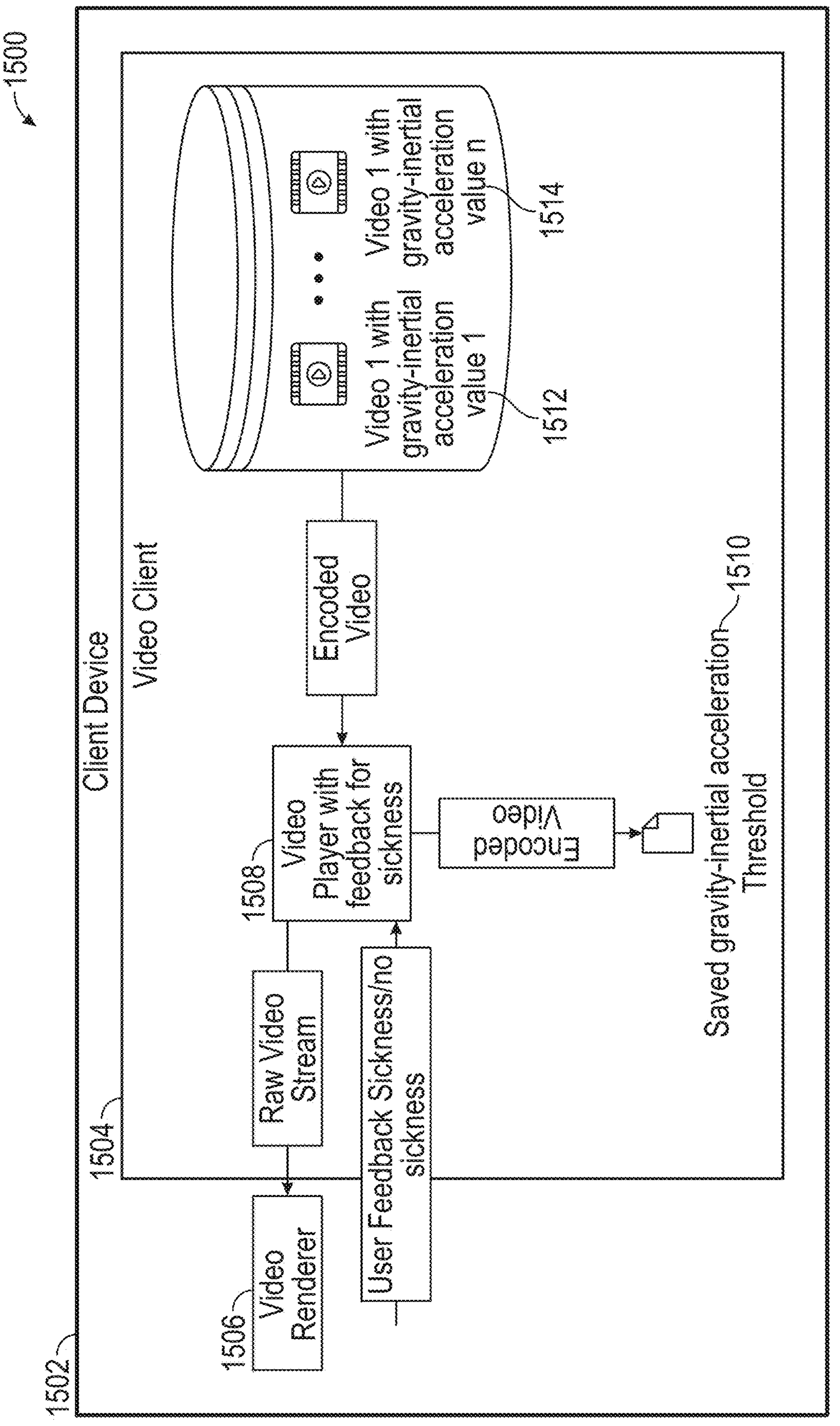
FIG. 15 is a system diagram of a media server performing sensitivity calibration of a user, in accordance with some embodiments of this disclosure.

FIG. 15 is a system diagram 1500 of a media server performing sensitivity calibration of a user, in accordance with some embodiments of this disclosure. The media server may generate a series of tests to determine if a user may get motion sick in a video conferencing/call situation. The media server may determine the likelihood of motion sickness (e.g., sensitivity setting) based on a user watching several videos with different IMU data captures with the video corresponding to the IMU data. The media server may calculate a gravity-inertial acceleration calculation from IMU data associated with the video. For example, the media server may generate multiple example videos with corresponding IMU data for varying levels of gravity-inertial acceleration which corresponds to the video shown to the user on the user device 1502. In some embodiments, the media server, on a client device 1502 utilizing a video client 1504, implements a video player with feedback for sickness at 1508 to receive one or more videos (e.g., video 1 with gravity-inertial acceleration value 1 (1512), and video n with gravity-inertial acceleration value n (1514)). The video player may transmit the raw video stream to a video renderer 1506. The media server generates for display, via a video client 1504, a feedback option for the user to define a threshold of gravity-inertial acceleration that will cause that user to become sick. This threshold (e.g., sensitivity setting) is saved by the media server in the user's profile as the user's threshold of motion sickness and will be used in the system to determine when to show the video feed or when to show an alternate rendering for any user's video stream causing the sickness at 1510.

In some embodiments, video client 1504 receives a manifest for the video, e.g., using MPEG DASH or HLS manifest. The manifest may include variant information, e.g., different links to different qualities of portions of the video for use in ABR streaming. In some embodiments, the manifest may also include variant links for portions that have visual modification to reduce motion sickness as described above. In some approaches, the manifest may also include IMU data for different portions or for different time intervals. Client 1504 may reference the IMU data and compare user profile preferences. If the IMU data indicates likely motion sickness based on the IMU data, client 1504 may request an alternative video portion listed in the manifest for modified video (e.g., a link for video with blur, reduced frame rate, or placeholder image). In some approaches, multiple variants of links to mitigated video portions are included. In this scenario, the video player 1508 may select one of the portions based on how severe the IMU reading is (e.g., the saved threshold at 1510).

Figure 16:
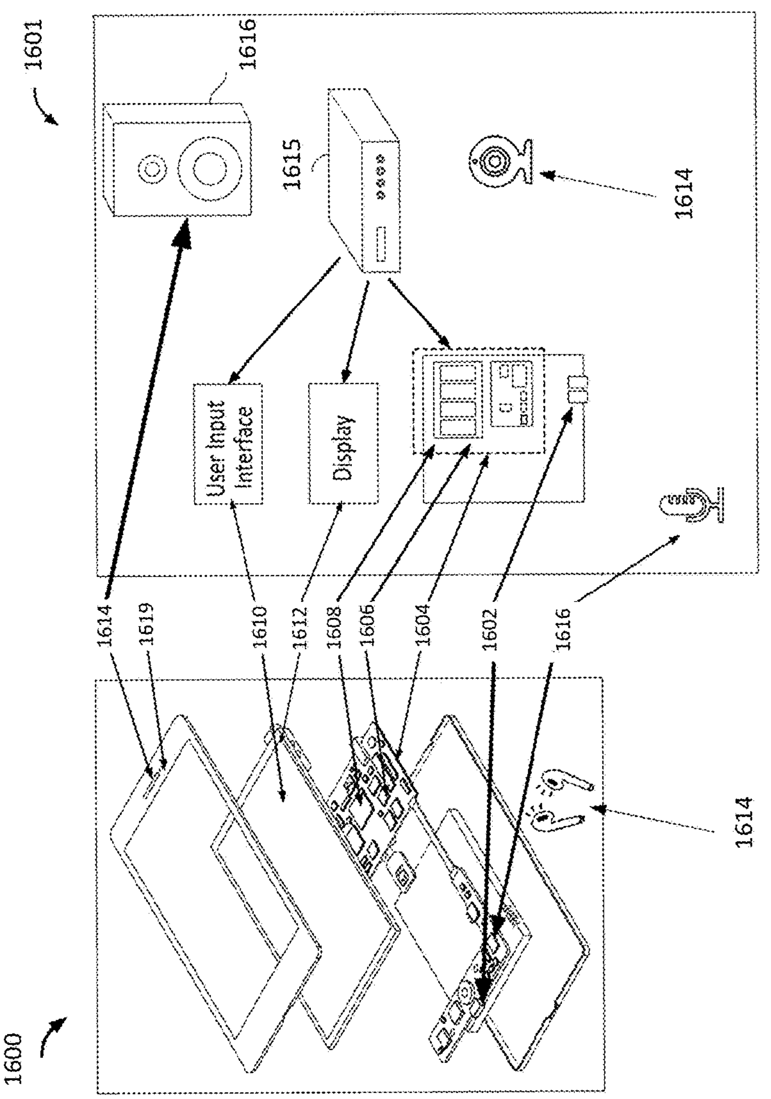
FIG. 16 shows illustrative user equipment devices, in accordance with some embodiments of this disclosure.
Figure 17:
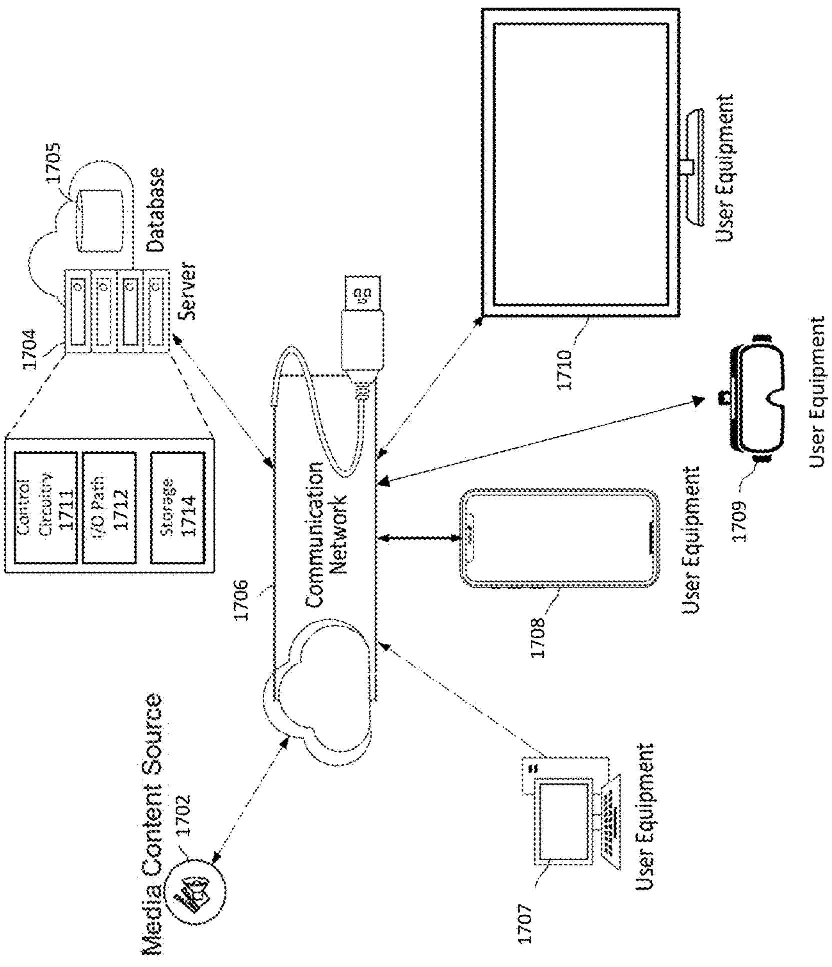
FIG. 17 shows illustrative systems, in accordance with some embodiments of this disclosure.

FIGS. 16-17 describe illustrative devices, systems, servers, and related hardware for a media application for efficient navigation of a plurality of media assets and for playing post-credit content in media assets by overriding play-next logic, in accordance with some embodiments of this disclosure. FIG. 16 shows generalized embodiments of illustrative user devices 1600 and 1601. For example, user equipment device 1600 may be a smartphone device, a tablet, smart glasses, a virtual reality or augmented reality device (e.g., AR goggles, AR headset, AR implemented via smartphone, tablet, or computer), or any other suitable device capable of consuming media assets and capable of transmitting and receiving data over a communication network. In another example, user equipment device 1601 may be a user television equipment system or device. User television equipment device 1601 may include set-top box 1615. Set-top box 1615 may be communicatively connected to microphone 1616, audio output equipment (e.g., speaker or headphones 1614), and display 1612. In some embodiments, microphone 1616 may receive audio corresponding to a voice of a user, e.g., a voice command. In some embodiments, display 1612 may be a television display or a computer display. In some embodiments, set-top box 1615 may be communicatively connected to user input interface 1610. In some embodiments, user input interface 1610 may be a remote control device. Set-top box 1615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 16. In some embodiments, device 1600 may comprise any suitable number of sensors, as well as a GPS module (e.g., in communication with one or more servers and/or cell towers and/or satellites) to ascertain a location of device 1600.

Each one of user equipment device 1600 and user equipment device 1601 may receive content and data via input/output (I/O) path 1602. I/O path 1602 may provide content (e.g., broadcast programming, on-demand programming, Internet content, content available over a local area network (LAN) or wide area network (WAN), and/or other content) and data to control circuitry 1604, which may comprise processing circuitry 1606 and storage 1608. Control circuitry 1604 may be used to send and receive commands, requests, and other suitable data using I/O path 1602, which may comprise I/O circuitry. I/O path 1602 may connect control circuitry 1604 (and specifically processing circuitry 1606) to one or more communications paths (described below). I/O functions may be provided by one or more of these communications paths, but are shown as a single path in FIG. 16 to avoid overcomplicating the drawing. While set-top box 1615 is shown in FIG. 16 for illustration, any suitable computing device having processing circuitry, control circuitry, and storage may be used in accordance with the present disclosure. For example, set-top box 1615 may be replaced by, or complemented by, a personal computer (e.g., a notebook, a laptop, a desktop), a smartphone (e.g., device 1600), a tablet, a network-based server hosting a user-accessible client device, a non-user-owned device, any other suitable device, or any combination thereof.

Control circuitry 1604 may be based on any suitable control circuitry such as processing circuitry 1606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1604 executes instructions for the Media application stored in memory (e.g., storage 1608). Specifically, control circuitry 1604 may be instructed by the Media application to perform the functions discussed above and below. In some implementations, processing or actions performed by control circuitry 1604 may be based on instructions received from the Media application.

In client/server-based embodiments, control circuitry 1604 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 16, the instructions may be stored in storage 1608 and executed by control circuitry 1604 of a device 1600.

In some embodiments, the media application may be a client/server application where only the client application resides on device 1600, and a server application resides on an external server (e.g., server 1704 and/or server 1716). For example, the media application may be implemented partially as a client application on control circuitry 1604 of device 1600 and partially on server 1704 as a server application running on control circuitry 1711. Server 1704 may be a part of a local area network with one or more of devices 1600 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 1704), referred to as "the cloud." Device 1600 may be a cloud client that relies on the cloud computing capabilities from server 1704 to determine whether processing should be offloaded and facilitate such offloading. When executed by control circuitry 1604 or 1711, the media application may instruct control circuitry 1604 or 1711 circuitry to perform processing tasks for the client device and facilitate a media consumption session integrated with social network services. The client application may instruct control circuitry 1604 to determine whether processing should be offloaded.

Control circuitry 1604 may include communications circuitry suitable for communicating with a server, social network service, a table or database server, or other networks or servers The instructions for carrying out the above-mentioned functionality may be stored on a server (which is described in more detail in connection with FIG. 16). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 16). In addition, communications circuitry may include circuitry that enables peer-to-peer communication of user equipment devices, or communication of user equipment devices in locations remote from each other (described in more detail below).

Memory may be an electronic storage device provided as storage 1608 that is part of control circuitry 1604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1608 may be used to store various types of content described herein as well as media application data described above. Nonvolatile memory may also be used (e.g., to launch a boot-up routine and other instructions). Cloud-based storage may be used to supplement storage 1608 or instead of storage 1608.

Control circuitry 1604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1604 may also include scaler circuitry for upconverting and down converting content into the preferred output format of user equipment 1600. Control circuitry 1604 may also include digital-to-analog converter circuitry and analog-to-digital converter circuitry for converting between digital and analog signals. The tuning and encoding circuitry may be used by user equipment device 1600, 1601 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1608 is provided as a separate device from user equipment device 1600, the tuning and encoding circuitry (including multiple tuners) may be associated with storage 1608.

Control circuitry 1604 may receive instruction from a user by way of user input interface 1610. User input interface 1610 may be any suitable user interface, such as a remote control, mouse, trackball, keypad, keyboard, touch screen, touchpad, stylus input, joystick, voice recognition interface, or other user input interfaces. Display 1612 may be provided as a stand-alone device or integrated with other elements of each one of user equipment device 1600 and user equipment device 1601. For example, display 1612 may be a touchscreen or touch-sensitive display. In such circumstances, user input interface 1610 may be integrated with or combined with display 1612. In some embodiments, user input interface 1610 includes a remote-control device having one or more microphones, buttons, keypads, any other components configured to receive user input or combinations thereof. For example, user input interface 1610 may include a handheld remote-control device having an alphanumeric keypad and option buttons. In a further example, user input interface 1610 may include a handheld remote-control device having a microphone and control circuitry configured to receive and identify voice commands and transmit information to set-top box 1615.

Audio output equipment 1614 may be integrated with or combined with display 1612. Display 1612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1612. Audio output equipment 1614 may be provided as integrated with other elements of each one of device 1600 and equipment 1601 or may be stand-alone units. An audio component of videos and other content displayed on display 1612 may be played through speakers (or headphones) of audio output equipment 1614. In some embodiments, audio may be distributed to a receiver (not shown), which processes and outputs the audio via speakers of audio output equipment 1614. In some embodiments, for example, control circuitry 1604 is configured to provide audio cues to a user, or other audio feedback to a user, using speakers of audio output equipment 1614. There may be a separate microphone 1616 or audio output equipment 1614 may include a microphone configured to receive audio input such as voice commands or speech. For example, a user may speak letters or words that are received by the microphone and converted to text by control circuitry 1604. In a further example, a user may voice commands that are received by a microphone and recognized by control circuitry 1604. Camera 1618 may be any suitable video camera integrated with the equipment or externally connected. Camera 1618 may be a digital camera comprising a charge-coupled device (CCD) and/or a complementary metal-oxide semiconductor (CMOS) image sensor. Camera 1618 may be an analog camera that converts to digital images via a video card.

The media application may be implemented using any suitable architecture. For example, it may be a stand-alone application wholly-implemented on each one of user equipment device 1600 and user equipment device 1601. In such an approach, instructions of the application may be stored locally (e.g., in storage 1608), and data for use by the application is downloaded on a periodic basis (e.g., from an out-of-band feed, from an Internet resource, or using another suitable approach). Control circuitry 1604 may retrieve instructions of the application from storage 1608 and process the instructions to provide media consumption and social network interaction functionality and generate any of the displays discussed herein. Based on the processed instructions, control circuitry 1604 may determine what action to perform when input is received from user input interface 1610. For example, movement of a cursor on a display up/down may be indicated by the processed instructions when user input interface 1610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1604 may allow a user to provide user profile information or may automatically compile user profile information. For example, control circuitry 1604 may access and monitor network data, video data, audio data, processing data, participation data from a media application and social network profile. Control circuitry 1604 may obtain all or part of other user profiles that are related to a particular user (e.g., via social media networks), and/or obtain information about the user from other sources that control circuitry 1604 may access. As a result, a user can be provided with a unified experience across the user's different devices.

In some embodiments, the media application is a client/server-based application. Data for use by a thick or thin client implemented on each one of user equipment device 1600 and user equipment device 1601 may be retrieved on-demand by issuing requests to a server remote to each one of user equipment device 1600 and user equipment device 1601. For example, the remote server may store the instructions for the application in a storage device. The remote server may process the stored instructions using circuitry (e.g., control circuitry 1604) and generate the displays discussed above and below. The client device may receive the displays generated by the remote server and may display the content of the displays locally on device 1600. This way, the processing of the instructions is performed remotely by the server while the resulting displays (e.g., that may include text, a keyboard, or other visuals) are provided locally on device 1600. Device 1600 may receive inputs from the user via input interface 1610 and transmit those inputs to the remote server for processing and generating the corresponding displays. For example, device 1600 may transmit a communication to the remote server indicating that an up/down button was selected via input interface 1610. The remote server may process instructions in accordance with that input and generate a display of the application corresponding to the input (e.g., a display that moves a cursor up/down). The generated display may then be transmitted to device 1600 for presentation to the user.

In some embodiments, the media application may be downloaded and interpreted or otherwise run by an interpreter or virtual machine (run by control circuitry 1604). In some embodiments, the media application may be encoded in the ETV Binary Interchange Format (EBIF), received by control circuitry 1604 as part of a suitable feed, and interpreted by a user agent running on control circuitry 1604. For example, the media application may be an EBIF application. In some embodiments, the media application may be defined by a series of JAVA-based files that are received and run by a local virtual machine or other suitable middleware executed by control circuitry 1604. In some of such embodiments (e.g., those employing MPEG-2 or other digital media encoding schemes), the media application may be, for example, encoded and transmitted in an MPEG-2 object carousel with the MPEG audio and video packets of a program.

FIG. 17 is a diagram of an illustrative system 1700, in accordance with some embodiments of this disclosure. User equipment devices 1707, 1708, 1709, 1710 (e.g., user device; devices or any other suitable devices, or any combination thereof) may be coupled to communication network 1706. Communication network 1706 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 17 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 1702-11x, etc.), or other short-range communication via wired or wireless paths. The user equipment devices may also communicate with each other directly through an indirect path via communication network 1706.

System 1700 may comprise media content source 1702, one or more servers 1704, and one or more social network services. In some embodiments, the media application may be executed at one or more of control circuitry 1711 of server 1704 (and/or control circuitry of user equipment devices 1707, 1708, 1709, 1710.

In some embodiments, server 1704 may include control circuitry 1711 and storage 1714 (e.g., RAM, ROM, Hard Disk, Removable Disk, etc.). Instructions for the media application may be stored in storage 1714. In some embodiments, the media application, via control circuitry, may execute functions outlined in FIGS. 1-5. Storage 1714 may store one or more databases. Server 1704 may also include an input/output path 1712. I/O path 1712 may provide media consumption data, social networking data, device information, or other data, over a local area network (LAN) or wide area network (WAN), and/or other content and data to control circuitry 1711, which may include processing circuitry, and storage 1714. Control circuitry 1711 may be used to send and receive commands, requests, and other suitable data using I/O path 1712, which may comprise I/O circuitry. I/O path 1712 may connect control circuitry 1711 (and specifically control circuitry) to one or more communications paths. I/O path 1712 may comprise I/O circuitry.

Control circuitry 1711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 1711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1711 executes instructions for an emulation system application stored in memory (e.g., the storage 1714). Memory may be an electronic storage device provided as storage 1714 that is part of control circuitry 1711.

Figure 18:
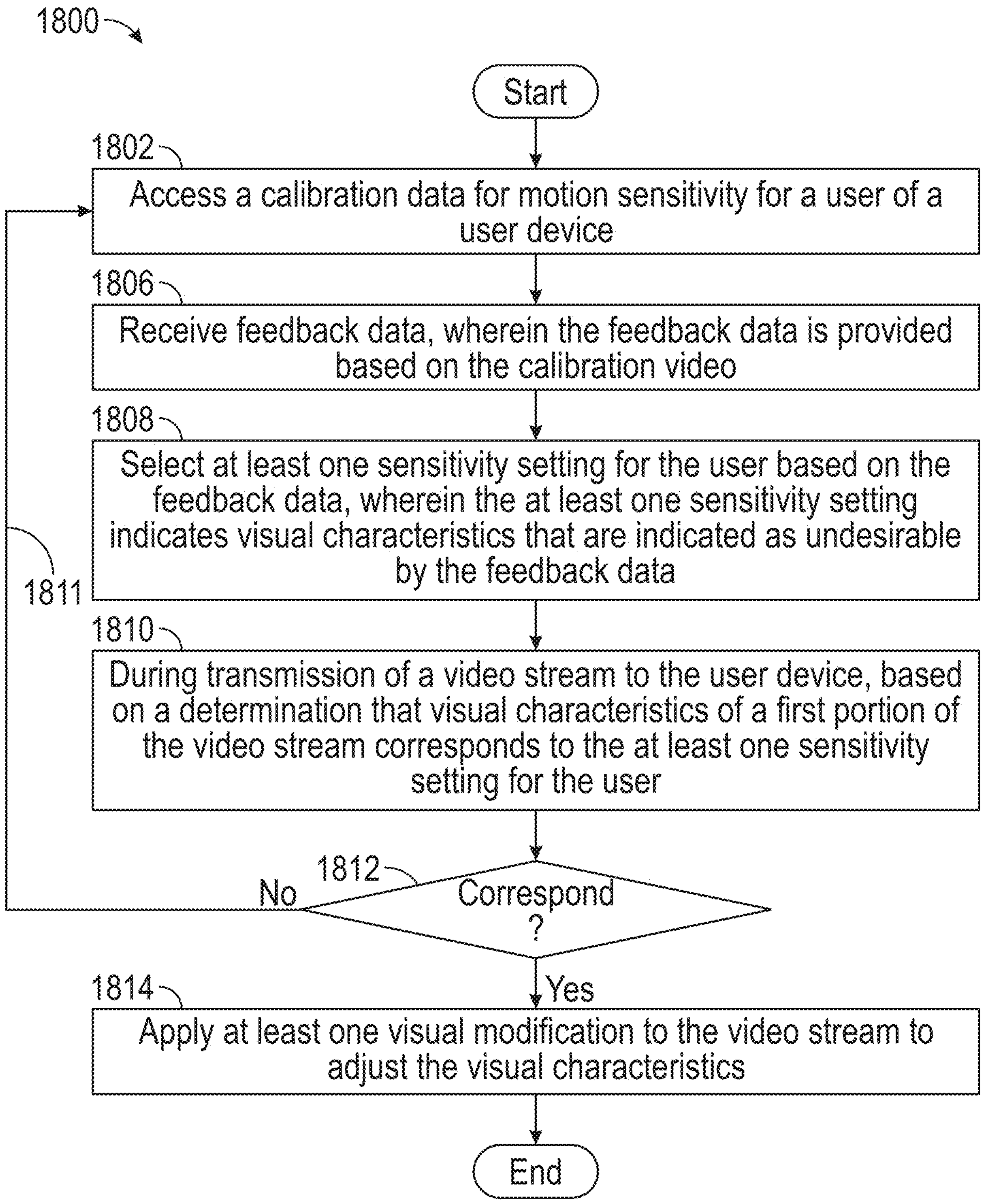
FIG. 18 is a flowchart of a detailed illustrative process for applying a visual modification to a video stream, in accordance with some embodiments of this disclosure.

FIG. 18 is a flowchart of a detailed illustrative process for applying a visual modification to a video stream, in accordance with some embodiments of this disclosure. In various embodiments, the individual steps of process 1800 may be implemented by one or more components of the devices and systems of FIGS. 1-17. Although the present disclosure may describe certain steps of process 1800 (and of other processes described herein) as being implemented by certain components of the devices and systems of FIGS. 1-17, this is for purposes of illustration only, and it should be understood that other components of the devices and systems of FIGS. 1-17 may implement those steps instead.

At 1802, the media server, via the control circuitry 1711, performs a calibration for motion sensitivity for a user of a user device (e.g., as shown in FIGS. 1A and 1B). The user device may be at least one of user equipment 1707, 1708, 1709, or 1710. The media server may perform the calibration utilizing the I/O path 1712 over the communication network 1706.

At 1806, the media server, via the control circuitry 1711, receives feedback data based on the calibration video. The media server may receive the feedback data utilizing the I/O path 1712 over the communication network 1706 for at least one of user equipment 1707, 1708, 1709, or 1710.

At 1808, the media server, via the control circuitry 1711, selects at least one sensitivity setting for the user based on the feedback data. The at least one sensitivity setting indicates visual characteristics that are indicated as undesirable by the feedback data.

At 1810, the media server, via the control circuitry 1711, during transmission of a video stream to the user device, the media server determines whether the visual characteristics of a first portion of the video stream corresponds to the at least one sensitivity setting for the user. If, at 1812, the media server determines the visual characteristics of the first portion of the video stream does not correspond to the at least one sensitivity setting for the user, the process reverts to 1804. If, at 1812, the media server determines the visual characteristics of the first portion of the video stream corresponds to the at least one sensitivity setting for the user, the process continues to 1814. At 1814, the media server, via the control circuitry 1711, applies at least one visual modification to the video stream to adjust the visual characteristics (e.g., similar to FIG. 2 at 214 and 216). The media server may apply the visual modification utilizing the I/O path 1712 over the communication network 1706 for at least one of user equipment 1707, 1708, 1709, or 1710.

Figure 19:
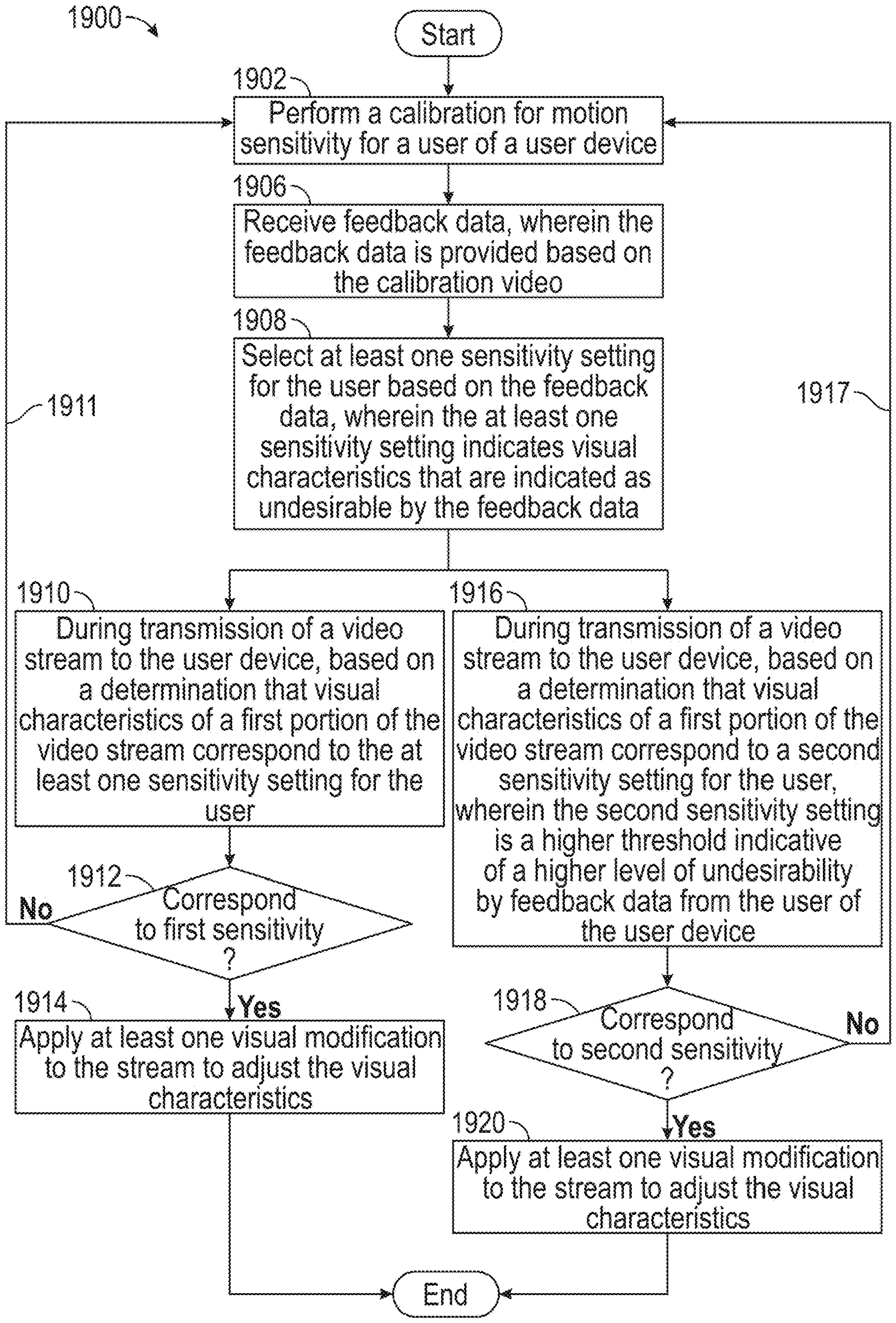
FIG. 19 is a flowchart of a detailed illustrative process for applying respective visual modifications to a video stream based on respective sensitivity settings, in accordance with some embodiments of this disclosure.

FIG. 19 is a flowchart of a detailed illustrative process 1900 for applying respective visual modifications to a video stream based on respective sensitivity settings, in accordance with some embodiments of this disclosure. At 1902, the media server, via the control circuitry 1711, performs a calibration for motion sensitivity for a user of a user device (e.g., similar to FIGS. 1A and 1B). The user device may be at least one of user equipment 1707, 1708, 1709, or 1710. The media server may perform the calibration utilizing the I/O path 1712 over the communication network 1706.

At 1906, the media server, via the control circuitry 1711, receives feedback data based on the calibration video. The media server may receive the feedback data utilizing the I/O path 1712 over the communication network 1706 for at least one of user equipment 1707, 1708, 1709, or 1710.

At 1908, the media server, via the control circuitry 1711, selects at least one sensitivity setting for the user based on the feedback data. The at least one sensitivity setting indicates visual characteristics that are indicated as undesirable by the feedback data.

At 1910, the media server, via the control circuitry 1711, during transmission of a video stream to the user device, the media server determines whether the visual characteristics of a first portion of the video stream corresponds to the at least one sensitivity setting for the user. If, at 1912, the media server determines the visual characteristics of the first portion of the video stream does not correspond to the at least one sensitivity setting for the user, the process reverts to 1904. If, at 1912, the media server determines the visual characteristics of the first portion of the video stream corresponds to the at least one sensitivity setting for the user, the process continues to 1914. At 1914, the media server, via the control circuitry 1711, applies at least one visual modification to the video stream to adjust the visual characteristics (e.g., similar to FIG. 2 at 214 and 216). The media server may apply the visual modification utilizing the I/O path 1712 over the communication network 1706 for at least one of user equipment 1707, 1708, 1709, or 1710.

At 1916, the media server, via the control circuitry 1711, during transmission of a video stream to the user device, the media server determines whether the visual characteristics of a first portion of the video stream corresponds to a second sensitivity setting for the user. The second sensitivity setting is a higher threshold indicative of a higher level of undesirability by feedback data from the user of the user device. If, at 1918, the media server determines the visual characteristics of the first portion of the video stream does not correspond to the at second sensitivity setting for the user, the process reverts to 1904. If, at 1918, the media server determines the visual characteristics of the first portion of the video stream corresponds to the second sensitivity setting for the user, the process continues to 1920. At 1920, the media server, via the control circuitry 1711, applies at least one visual modification to the video stream to adjust the visual characteristics (e.g., similar to FIG. 2 at 214 and 216). The media server may apply the visual modification utilizing the I/O path 1712 over the communication network 1706 for at least one of user equipment 1707, 1708, 1709, or 1710.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing calibration data for motion sensitivity for a user of a user device, wherein the calibration data is based on:

receiving feedback data when the user device displays videos comprising a plurality of motion types;

selecting at least one sensitivity setting for the user based on the feedback data, wherein the at least one sensitivity setting indicates visual characteristics that are indicated as undesirable by the feedback data;

during transmission of a video stream to the user device from a second device:

receiving an inertial measurement unit (IMU) sensor data from the second device, wherein the IMU sensor data is multiplexed to a first portion of the video stream, wherein the IMU sensor data that is related to one or more frames of the first portion of the video are received prior to the respective one or more frames of the first portion of the video;

based on determining, based at least on the IMU sensor data, that visual characteristics of the first portion of the video stream correspond to the at least one sensitivity setting for the user:

causing at least one visual modification to be applied to the video stream to adjust the visual characteristics for duration of the first portion of the video stream.

2. The method of claim 1, wherein the calibration data is further based on:

generating for display a plurality of videos requested by the user from a plurality of media services; and wherein the receiving the feedback data comprises gathering biometric data while generating for display the plurality of videos requested by the user from the plurality of media services.

3. The method of claim 1, wherein the calibration data is further based on:

generating for display a calibration video, wherein the calibration video comprises depictions of the plurality of motion types.

4. The method of claim 3, wherein the receiving feedback data comprises:

generating for display, through a user interface, a plurality of sensitivity options for selection comprising selections of desirable to undesirable; and receiving a user interface input from the user device indicating a selected sensitivity option from the plurality of sensitivity options.

5. The method of claim 1, wherein the causing the at least one visual modification comprises at least one of:

applying a blur filter to the first portion of the video stream;

dropping a subset of frames of the first portion of the video stream; or replacing the first portion of the video stream with a static frame of the first portion of the video stream.

6. The method of claim 1, wherein the user device is a first user device and wherein the video stream originates as a live stream of a camera feed of the second device transmitted to a plurality of devices;

the method further comprising:

based at least in part on determining that the visual characteristics of the first portion of the video stream corresponds to the at least one sensitivity setting for at least one user of any of the plurality of devices:

transmitting for display on the second user device, a notification that visual characteristics are indicated as undesirable for at least one device that is receiving the live stream.

7. The method of claim 1, wherein determining, based at least on the IMU sensor data, that the visual characteristics of the first portion of the video stream corresponds to the at least one sensitivity setting for the user comprises:

analyzing the IMU sensor data to determine that the visual characteristics of the first portion of the video stream corresponds to the at least one sensitivity setting for the user.

8. The method of claim 6, wherein the causing the at least one visual modification to be applied to the stream to adjust the visual characteristics for duration of the first portion of the video stream, comprises the at least one visual modification to be applied to the live stream of the camera feed of the second device transmitted to the plurality of devices.

9. The method of claim 1, wherein determining that visual characteristics of the first portion of the video stream corresponds to the at least one sensitivity setting for the user further comprises:

determining whether that visual characteristics of the first portion of the video stream corresponds to a second sensitivity setting, wherein the second sensitivity setting is a higher threshold indicative of a higher level of undesirability by feedback data from the user of the user device; and causing a visual modification to be applied to the stream to adjust the visual characteristics for duration of the first portion of the video stream.

10. A system comprising:

control circuitry configured to:

access calibration data for motion sensitivity for a user of a user device, wherein the calibration data is based on:

receive feedback data when the user device displays videos comprising a plurality of motion types;

select at least one sensitivity setting for the user based on the feedback data, wherein the at least one sensitivity setting indicates visual characteristics that are indicated as undesirable by the feedback data;

during transmission of a video stream to the user device from a second device:

receive an inertial measurement unit (IMU) sensor data from the second device, wherein the IMU sensor data is multiplexed to a first portion of the video stream, wherein the IMU sensor data that is related to one or more frames of the first portion of the video are received prior to the respective one or more frames of the first portion of the video;

based on determining that visual characteristics of the first portion of the video stream correspond to the at least one sensitivity setting for the user:

cause at least one visual modification to be applied to the video stream to adjust the visual characteristics for duration of the first portion of the video stream.

11. The system of claim 10, wherein the calibration data is based on control circuitry configured to:

generate for display a plurality of videos requested by the user from a plurality of media services; and wherein the receiving the feedback data comprises gathering biometric data while generating for display the plurality of videos requested by the user from the plurality of media services.

12. The system of claim 10, wherein the calibration data is based on control circuitry configured to:

generate for display a calibration video, wherein the calibration video comprises depictions of the plurality of motion types.

13. The system of claim 12, wherein the system is configured, when receiving feedback data, to:

generate for display, through a user interface, a plurality of sensitivity options for selection comprising selections of desirable to undesirable; and receive a user interface input from the user device indicating a selected sensitivity option from the plurality of sensitivity options.

14. The system of claim 10, wherein the causing the at least one visual modification comprises at least one of:

applying a blur filter to the first portion of the video stream;

dropping a subset of frames of the first portion of the video stream; or replacing the first portion of the video stream with a static frame of the first portion of the video stream.

15. The system of claim 10, wherein the user device is a first user device and wherein the video stream originates as a live stream of a camera feed of the second device transmitted to a plurality of devices;

the system is further configured to:

based at least in part on determining that the visual characteristics of the first portion of the video stream corresponds to the at least one sensitivity setting for at least one user of any of the plurality of devices:

transmit for display on the second user device, a notification that visual characteristics are indicated as undesirable for at least one device that is receiving the live stream.

16. The system of claim 10, wherein the system is configured, when determining, based at least on the IMU sensor data, that the visual characteristics of the first portion of the video stream corresponds to the at least one sensitivity setting for the user, to:

analyze the IMU sensor data to determine that the visual characteristics of the first portion of the video stream corresponds to the at least one sensitivity setting for the user.

17. The system of claim 15, wherein the causing the at least one visual modification to be applied to the stream to adjust the visual characteristics for duration of the first portion of the video stream, comprises the at least one visual modification to be applied to the live stream of the camera feed of the second device transmitted to the plurality of devices.

18. The system of claim 10, wherein the system is further configured, when determining that visual characteristics of the first portion of the video stream corresponds to the at least one sensitivity setting for the user, to:

determine whether that visual characteristics of the first portion of the video stream corresponds to a second sensitivity setting, wherein the second sensitivity setting is a higher threshold indicative of a higher level of undesirability by feedback data from the user of the user device; and cause a visual modification to be applied to the stream to adjust the visual characteristics for duration of the first portion of the video stream.

* * * * *